US010146086B2

(12) United States Patent
Sakai et al.

(10) Patent No.: US 10,146,086 B2
(45) Date of Patent: Dec. 4, 2018

(54) MIRROR DISPLAY, HALF MIRROR PLATE, AND ELECTRONIC DEVICE

(71) Applicant: Sharp Kabushiki Kaisha, Osaka-shi, Osaka (JP)

(72) Inventors: Akira Sakai, Osaka (JP); Masahiro Hasegawa, Osaka (JP); Hiroyuki Hakoi, Osaka (JP); Hidefumi Yoshida, Osaka (JP); Shigeaki Mizushima, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 313 days.

(21) Appl. No.: 14/909,545

(22) PCT Filed: Jul. 24, 2014

(86) PCT No.: PCT/JP2014/069530
§ 371 (c)(1),
(2) Date: Feb. 2, 2016

(87) PCT Pub. No.: WO2015/019858
PCT Pub. Date: Feb. 12, 2015

(65) Prior Publication Data
US 2016/0178964 A1 Jun. 23, 2016

(30) Foreign Application Priority Data

Aug. 5, 2013 (JP) .................................. 2013-162422

(51) Int. Cl.
*G02F 1/13363* (2006.01)
*G02F 1/1335* (2006.01)
(Continued)

(52) U.S. Cl.
CPC ..... *G02F 1/133536* (2013.01); *G02B 5/3016* (2013.01); *G02B 5/3083* (2013.01);
(Continued)

(58) Field of Classification Search
CPC ...... G02B 5/3083; G02B 5/08; G02B 27/145; G02F 1/133536; G02F 1/0063;
(Continued)

(56) References Cited

U.S. PATENT DOCUMENTS

2004/0051827 A1 3/2004 Hinata et al.
2004/0100598 A1* 5/2004 Adachi ............. G02F 1/133536
349/113

(Continued)

FOREIGN PATENT DOCUMENTS

CN 104919364 A 9/2015
JP 11-015392 A 1/1999
(Continued)

OTHER PUBLICATIONS

Official Communication issued in International Patent Application No. PCT/JP2014/069530, dated Sep. 16, 2014.

*Primary Examiner* — Thoi Duong
(74) *Attorney, Agent, or Firm* — Keating & Bennett, LLP

(57) ABSTRACT

The present invention provides a mirror display that sufficiently prevents a decrease in the screen luminance in the display mode while sufficiently increasing the reflectance in the mirror mode, and also gives excellent production efficiency. The mirror display includes a half mirror plate including at least two half mirror layers; and a display device arranged on the backside of the half mirror plate, the display device including a polarizer, the at least two half mirror layers including at least one reflective polarizer, the transmission axis of the polarizer and the transmission axis of the at least one reflective polarizer being substantially parallel to each other or substantially perpendicular to each other, the mirror display configured to switch a display mode allowing display light to be emitted from the display device and to pass through the half mirror plate and a mirror mode preventing display light from being emitted from the display (Continued)

device, the mirror display exhibiting a sum of the transmittance in the display mode and the reflectance in the mirror mode of 100% or higher.

14 Claims, 15 Drawing Sheets

(51) Int. Cl.
G02B 5/30 (2006.01)
G02B 27/14 (2006.01)
G02B 27/28 (2006.01)
G06T 11/00 (2006.01)
G06T 11/40 (2006.01)
G09G 3/34 (2006.01)
G09G 3/36 (2006.01)
G06T 3/60 (2006.01)

(52) U.S. Cl.
CPC ......... *G02B 27/145* (2013.01); *G02B 27/286* (2013.01); *G06T 3/60* (2013.01); *G06T 11/001* (2013.01); *G06T 11/40* (2013.01); *G09G 3/3406* (2013.01); *G09G 3/36* (2013.01); *G09G 3/3611* (2013.01); *G02F 2001/133557* (2013.01); *G02F 2001/133562* (2013.01); *G02F 2001/133638* (2013.01); *G09G 2340/04* (2013.01)

(58) Field of Classification Search
CPC ................ G02F 1/0311; G02F 1/1335; G02F 1/133528; G02F 1/133555; G02F 1/13363; G02F 2001/133545; G02F 2001/133638; G02F 2001/133531; G02F 2001/133557; G02F 2001/133562; G02F 2413/07; G02F 2413/08
See application file for complete search history.

(56) References Cited

U.S. PATENT DOCUMENTS

| | | | |
|---|---|---|---|
| 2005/0200776 A1* | 9/2005 | Hara | G02B 5/3041 349/98 |
| 2006/0159958 A1 | 7/2006 | Lee | |
| 2006/0262401 A1* | 11/2006 | Takahashi | G02B 5/3066 359/487.02 |
| 2008/0252832 A1* | 10/2008 | Nieuwkerk | G02F 1/133504 349/112 |
| 2013/0271674 A1* | 10/2013 | Liu | G02F 1/133621 349/12 |
| 2014/0359526 A1 | 12/2014 | Oshima | |
| 2016/0026039 A1 | 1/2016 | Sakai et al. | |

FOREIGN PATENT DOCUMENTS

| | | |
|---|---|---|
| JP | 2003-241175 A | 8/2003 |
| JP | 2004-085590 A | 3/2004 |
| JP | 2004-125885 A | 4/2004 |
| JP | 2005-195824 A | 7/2005 |
| JP | 2006-201782 A | 8/2006 |
| JP | 2007-065314 A | 3/2007 |
| JP | 2009-103817 A | 5/2009 |
| JP | 2013-114558 A | 6/2013 |

* cited by examiner

MIRROR DISPLAY, HALF MIRROR PLATE, AND ELECTRONIC DEVICE

TECHNICAL FIELD

The present invention relates to a mirror display, a half mirror plate, and an electronic device. The present invention specifically relates to a mirror display that can be driven in both a mirror mode in which the display serves as a mirror and a display mode in which the display shows an image, a half mirror plate to be used in the mirror display, and an electronic device including the mirror display.

BACKGROUND ART

FIG. 29 is an explanatory view illustrating the display states in the power-on state and in the power-off state of a common conventional display device. As illustrated in FIG. 29, a display device 101 in the power-on state shows an image in a display region A. A region (frame region B) called a frame or a bezel in the periphery of the display region A does not contribute to image display. In contrast, a display device 102 in the power-off state shows no image in the display region A, and the frame region B still does not contribute to image display.

Such common conventional display devices show only a black or gray screen when they show no image (for example, when they are in the power-off state), so that the devices are useless for users. On the contrary, large-size, difficult-to-move display devices (e.g., digital signage and television receivers) can be mere obstructions for users when they are in the non-display state because they occupy the same space either in the non-display state or in the display state. In particular, a large-size display device with a black screen in a bright room may not match the interior design, looking as if it is misplaced. In other words, such common conventional display devices have their own value only when they are in the display state.

Techniques to overcome this disadvantage have been suggested. For example, Patent Literatures 1 to 4 disclose a mirror display that includes a half mirror plate in front of a display device so that it can serve as a mirror when the display is in the non-display state. Such a mirror display can serve not only as a display, which is the original purpose, but also as a mirror. Specifically, when display light is emitted from the display device, the mirror display utilizes the display light to show an image in a region where the display light is emitted from the display device. When no display light is emitted from the display device, on the other hand, the mirror display reflects the outside light and serves as a mirror in a region where the display light is not emitted from the display device.

Examples of known optical components having a reflex function include multi-layer reflective polarizers, nanowire grid polarizers (e.g. Patent Literatures 5 and 6), and circular-polarized-light separation sheets (e.g. Patent Literature 7) utilizing selective reflection of cholesteric liquid crystal.

CITATION LIST

Patent Literature

Patent Literature 1: JP 2003-241175 A
Patent Literature 2: JP H11-15392 A
Patent Literature 3: JP 2004-085590 A
Patent Literature 4: JP 2004-125885 A
Patent Literature 5: JP 2006-201782 A
Patent Literature 6: JP 2005-195824 A
Patent Literature 7: JP 2007-65314 A

SUMMARY OF INVENTION

Technical Problem

Some half mirror plates, however, have a structure that cannot achieve a sufficient reflectance in the mirror mode, and that decrease the screen luminance in the display mode.

For example, the invention of Patent Literature 4 discloses the case that a reflective polarizer is used as a half mirror layer. However, the reflectance of one reflective polarizer is theoretically limited to about 50%. This limitation unfortunately gives an insufficient reflectance in the mirror mode, leading to an insufficient mirror function of the mirror display. This technique therefore can still be improved.

Also, a half mirror plate using a vapor-deposited metal film as a half mirror layer transmits only part of the incident light, and reflects and/or absorbs the rest of the incident light. Such a half mirror plate is more disadvantageous than a half mirror plate using a reflective polarizer as a half mirror layer in terms of the screen luminance in the display mode. In the case of using such a half mirror plate, the sum of the transmittance in the display mode and the reflectance in the mirror mode is limited to 100% or lower. The limitation causes a problem that increasing the reflectance in the mirror mode leads to a decrease in the screen luminance in the display mode. The technique can still be improved in this respect.

In view of these problems, the inventors have found that a half mirror plate including reflective polarizers arranged such that their transmissive axes intersect each other can sufficiently increase the reflectance in the mirror mode while sufficiently preventing a decrease in the screen luminance in the display mode. Still, further studies by the inventors revealed that some arrangements of a half mirror layer, which constitutes a half mirror plate, decrease the production efficiency.

Examples of such arrangements are considered below for the case that two reflective polarizers (half mirror layers) are arranged such that their transmission axes intersect each other. Here, if the two reflective polarizers are the same-size square, rectangular, or roll shape and are provided with the respective transmission axes set at the same azimuth angle, the transmission axes can be made to intersect each other by rotating one of the reflective polarizers with respect to the other. However, the rotation causes the overlapping region of the reflective polarizers to be narrower than the original areas of the reflective polarizers, deteriorating the area yield. Use of this configuration for a large-size display device therefore requires the original areas of the reflective polarizers to be larger, and the increase may result in a high production cost. For example, when the reflectance is designed to be about 70% in this configuration, the transmission axes of reflective polarizers form an angle of 45°. Here, if each reflective polarizer has 1300-mm short sides, the configuration can be employed only in 40-inch or smaller display devices.

It is also possible to prepare in advance reflective polarizers with their transmission axes set at predetermined azimuth angles. This case, however, requires preparation of different multiple kinds of reflective polarizers suited for different reflectances, so that the production cost may be increased. In many reflective polarizers producible into a roll shape, such as multi-layer reflective polarizers, the azimuth angles of the transmission axes are limited to azimuth angles parallel to or perpendicular to the machine direction of the roll. Hence, in the case of using two reflective polarizers with their transmission axes intersecting each other, the reflective polarizers may not be subjected to the roll-to-roll attachment process, and may increase the production cost.

Meanwhile, the reflectance is theoretically limited to about 50% when the transmission axes of the reflective polarizers are arranged in parallel with each other, the insufficient reflectance in the mirror mode unfortunately leads to an insufficient mirror function of the mirror display. Hence, this configuration can still be improved.

The present invention was made in view of the above state of the art, and aims to provide a mirror display that sufficiently prevents a decrease in the screen luminance in the display mode while sufficiently increasing the reflectance in the mirror mode, and also gives excellent production efficiency; a half mirror plate to be used in the mirror display, and an electronic device including the mirror display.

Solution to Problem

The inventors have made various studies on mirror displays as described above. As a result, the inventors have found that it is possible to sufficiently prevent a decrease in the screen luminance in the display mode while sufficiently increasing the reflectance in the mirror mode by including multiple reflective polarizers in a half mirror plate, and arranging the reflective polarizers such that the transmission axes of the respective reflective polarizers intersect each other.

In this method, however, the reflective polarizers are required to be disposed such that the transmission axes of the respective reflective polarizers intersect each other in order to achieve a reflectance much higher than 50%. This arrangement may lead to a decrease in the area yield of the reflective polarizers which causes an increase in the production cost, as described above.

The inventors have therefore made various studies on mirror displays that can sufficiently prevent a decrease in the screen luminance in the display mode while exhibiting a sufficiently high reflectance in the mirror mode, and that provide excellent production efficiency. As a result, the inventors have found that mirror displays having the following configuration can sufficiently prevent a decrease in the screen luminance in the display mode while sufficiently increasing the reflectance in the mirror mode, and can also provide excellent production efficiency. The configuration is that a half mirror plate is provided with at least two half mirror layers including at least one reflective polarizer, and the transmission axis of the at least one reflective polarizer included in the half mirror layers is substantially parallel to or substantially perpendicular to the transmission axis of a polarizer provided to a display device arranged on the backside of the half mirror plate. The inventors have found that this configuration can overcome the above disadvantages, and thereby the inventors have arrived at the present invention.

That is, one aspect of the present invention may be a mirror display including: a half mirror plate including at least two half mirror layers; and a display device arranged on the backside of the half mirror plate, the display device including a polarizer, the at least two half mirror layers including at least one reflective polarizer, the transmission axis of the polarizer and the transmission axis of the at least one reflective polarizer being substantially parallel to each other or substantially perpendicular to each other, the mirror display configured to switch a display mode allowing display light to be emitted from the display device and to pass through the half mirror plate and a mirror mode preventing display light from being emitted from the display device, the mirror display exhibiting a sum of the transmittance in the display mode and the reflectance in the mirror mode of 100% or higher.

Another aspect of the present invention may be a half mirror plate, including at least two half mirror layers, the at least two half mirror layers including at least one reflective polarizer, the transmission axis of the at least one reflective polarizer being substantially parallel to or substantially perpendicular to the transmission axis of a polarizer included in a display device.

Yet another aspect of the present invention may be an electronic device, including the above mirror display.

Advantageous Effects of Invention

The mirror display, the half mirror plate, and the electronic device of the present invention can sufficiently prevent a decrease in the screen luminance in the display mode while sufficiently increasing the reflectance in the mirror mode, and can also give excellent production efficiency.

DESCRIPTION OF EMBODIMENTS

Hereinafter, the present invention will be described in more detail with reference to drawings based on the following examples which, however, are not intended to limit the scope of the present invention. Also, the configurations in the examples may be appropriately combined or may be modified without departing from the spirit of the present invention.

EXAMPLE 1

Example 1 relates to a mirror display including a liquid crystal display device, two reflective polarizers that serve as half mirror layers, and a λ/2 plate. The term "half mirror layer" herein means a translucent layer that has reflectivity for incident light and that preferably has a reflectance for natural light of 40% or higher, and more preferably 50% or higher. The term "reflectance" herein means a "luminous reflectance" unless otherwise mentioned. The half mirror layer may absorb part of incident light.

Figure 1:
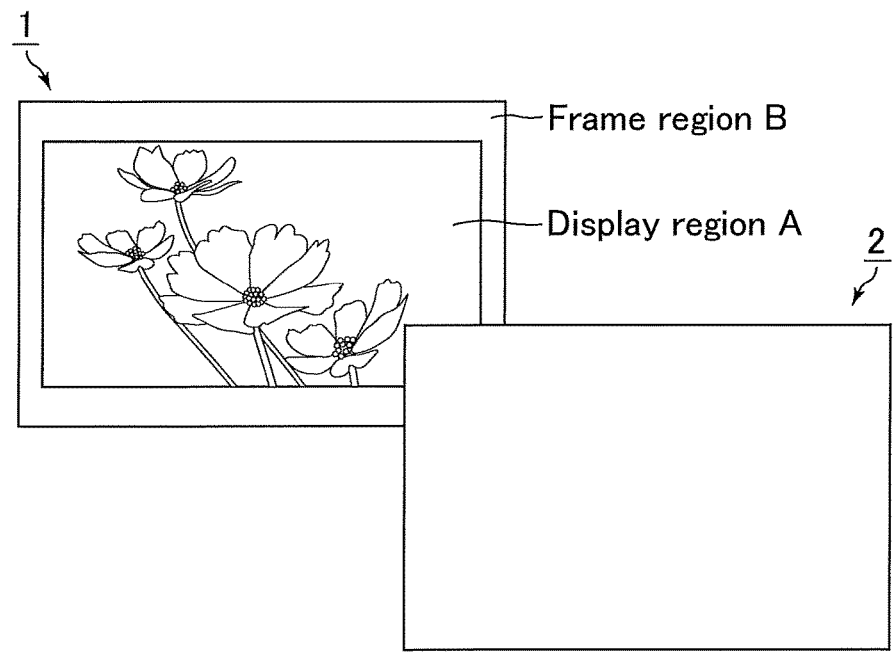
FIG. 1 is an explanatory view illustrating a screen in a display mode and a screen in a mirror mode in a mirror display of Example 1.

FIG. 1 is an explanatory view illustrating a screen in a display mode and a screen in a mirror mode in a mirror display of Example 1. As illustrated in FIG. 1, in a mirror display 1 in the display mode, a display region A shows an image and a frame region B serves as a mirror. In contrast, in a mirror display 2 in the mirror mode, the display region A and the frame region B together form a single mirror surface, so that the whole surface of the mirror display serves as a mirror. The display mode and the mirror mode may be activated at the same time to utilize as a mirror the domain not displaying an image in the display region A.

Figure 2:
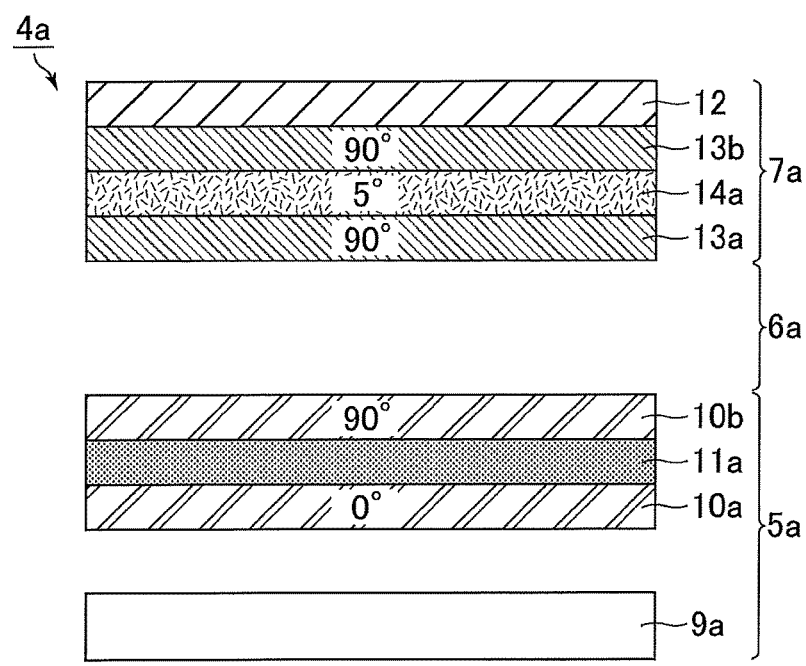
FIG. 2 is a schematic cross-sectional view illustrating the structure of the mirror display of Example 1.

FIG. 2 is a schematic cross-sectional view illustrating the structure of the mirror display of Example 1. FIG. 2 is a view illustrating a cross section of part of the display region A in FIG. 1. As illustrated in FIG. 2, a mirror display 4a of Example 1 includes a liquid crystal display device 5a, an air layer 6a, and a half mirror plate 7a in the order set forth from the back-surface side (the backside of the half mirror plate) to the viewer side (the front side of the half mirror plate). The liquid crystal display device 5a and the half mirror plate 7a were fixed by fitting the upper and lower edges of the half mirror plate 7a to a pair of aluminum rails which are attached to the upper and lower edges of the liquid crystal display device 5a so as to form a frame-like structure. The air layer 6a is the space formed in a slight gap between the liquid crystal display device 5a and the half mirror plate 7a.

The liquid crystal display device 5a used was a liquid crystal television (trade name: LC-20F5, manufactured by Sharp Corp.) including a backlight 9a, two absorptive polarizers 10a and 10b disposed in crossed Nicols, and a liquid crystal panel 11a. The transmission axis of the back-surface side absorptive polarizer 10a was at an azimuth angle of 0° and the transmission axis of the viewer-side absorptive polarizer 10b was at an azimuth angle of 90°, provided that the degree of azimuth angle is defined to increase in positive (+) in the counterclockwise direction starting from the long side of the liquid crystal display device 5a. The azimuth angles of the axes are described on the basis of the above definition hereinbelow. The viewer-side absorptive polarizer 10b underwent no anti-reflection treatment but underwent an anti-glare (AG) treatment with a haze of 3.0% on the surface thereof. The display mode of the liquid crystal panel 11a was UV²A. The liquid crystal display device 5a may appropriately include a component such as a bezel in a portion corresponding to the frame region B in FIG. 1. A suitable bezel is one made of a black plastic resin.

The absorptive polarizer 10b disposed on the viewer side of the liquid crystal display device 5a may be eliminated and the effects thereof may alternatively be achieved by a reflective polarizer 13a which serves as a half mirror layer disposed in the half mirror plate 7a. Still, reflective polarizers usually have a lower degree of polarization than absorptive polarizers. Thus, elimination of the absorptive polarizer 10b decreases the contrast of the mirror display in the display mode. On the contrary, if the reflective polarizer 13a has a sufficient degree of polarization, the absorptive polarizer 10b disposed on the viewer side of the liquid crystal display device 5a can be eliminated. In order to eliminate the absorptive polarizer 10b, the degree of polarization of the reflective polarizer 13a is preferably 90% or higher (the contrast ratio is 10 or higher), and the degree of polarization is more preferably 99% or higher (the contrast ratio is 100 or higher).

The half mirror plate 7a includes, from the back-surface side to the viewer side, a reflective polarizer 13a, a λ/2 plate 14a, a reflective polarizer 13b, and a 2.5-mm-thick glass plate 12. The respective components were bonded with an acrylic pressure-sensitive adhesive (not illustrated). In order to allow the half mirror plate 7a to sufficiently serve as a mirror, no anti-reflection film was disposed on the viewer side of the glass plate 12. The thickness of the glass plate 12 is not limited to 2.5 mm as mentioned above, and may be thinner or thicker than this value. A suitable material of the glass plate 12 is toughened glass. The glass plate 12 may be replaced by a transparent plate made of acrylic resin, for example.

The reflective polarizers 13a and 13b may each be a multi-layer reflective polarizer or a nanowire-grid polarizer, for example. Examples of the multi-layer reflective polarizer include a reflective polarizer (trade name: DBEF) manufactured by Sumitomo 3M Ltd. Examples of the nanowire-grid polarizer include those disclosed in Parent Literatures 5 and 6. The present example used an inexpensive multi-layer reflective polarizer (trade name: DBEF) manufactured by Sumitomo 3M Ltd., which shows mass-production results of large-area polarizers. The reflective polarizers 13a and 13b each were disposed such that the transmission axis was at an azimuth angle of 90°. The transmission axis (azimuth angle: 0°) of the absorptive polarizer 10a and the transmission axes (azimuth angle: 90°) of the reflective polarizers 13a and 13b are therefore substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The λ/2 plate 14a used was prepared by uniaxially stretching a cycloolefinic polymer film (trade name: ZeonorFilm, manufactured by ZEON Corp.) to adjust the in-plane phase difference to 275 nm. The slow axis of the λ/2 plate 14a was at an azimuth angle of 5°. The in-plane phase difference and the slow axis were measured with a dual-rotating retarder polarimeter (trade name: Axo-scan, manufactured by Axometrics). The same applies to each of the following examples. Unless otherwise specified, the measurement results shown are the results of measurements with a wavelength of 550 nm.

Each of the glass plate 12, the reflective polarizers 13a and 13b, and the λ/2 plate 14a may be extended to the portion corresponding to the frame region B in FIG. 1.

The mirror display 4a of the present example can be driven in both the display mode and the mirror mode based on the following principles.

In the display mode, the liquid crystal panel 11a shows an image and a viewer observes the image on the liquid crystal panel 11a through the half mirror plate 7a. The light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. The light having passed through the reflective polarizer 13a passes through the λ/2 plate 14a, and thereby the azimuth angle of the vibration is rotated. The linearly polarized light in the relative azimuth angle (angle formed by the slow axis of the λ/2 plate 14a and the vibration direction of the linearly polarized light) of φ passes through the λ/2 plate 14a to be linearly polarized light in a relative azimuth angle of –φ. Light having passed through the λ/2 plate 14a whose slow axis is at an azimuth angle of 5° therefore becomes linearly polarized light vibrating in an azimuth angle of –80°. In contrast, the transmission axis of the reflective polarizer 13b is at an azimuth angle of 90°. Here, the linearly polarized light vibrating in an azimuth angle of –80° can be divided into a linearly polarized light component vibrating in an azimuth angle of 0° and a linearly polarized light component vibrating in an azimuth angle perpendicular to the above component, i.e., an azimuth angle of 90°. Thus, when linearly polarized light vibrating in an azimuth angle of –80° is incident on the reflective polarizer 13b whose transmission axis is at an azimuth angle of 90°, the linearly polarized light component vibrating in an azimuth angle of 90° can pass through the reflective polarizer. As a result, the mirror display 4a of the present example can show an image with a high luminance even though it includes the half mirror plate 7a.

In the mirror mode, the liquid crystal panel 11a shows no image and a viewer observes only the outside light reflected on the surface of the half mirror plate 7a. Specifically, most of the linearly polarized light components vibrating in an azimuth angle of 0° among the light components incident on the half mirror plate 7a from the viewer side are reflected on the reflective polarizer 13b whose transmission axis is at an azimuth angle of 90°, in other words, whose reflection axis is at an azimuth angle of 0°.

The linearly polarized light components vibrating in an azimuth angle of 90° among the light components incident on the half mirror plate 7a from the viewer side pass through the reflective polarizer 13b whose transmission axis is at an azimuth angle of 90°. The azimuth angle of the vibration of the light having passed through the reflective polarizer 13b is then rotated by the λ/2 plate 14a, and some of the light components are reflected on the reflective polarizer 13a. The reflected light passes through the λ/2 plate 14a again, so that the polarization state is changed. Then, some of the light components having passed through the λ/2 plate 14a can pass through the reflective polarizer 13b. The mirror display 4a of the present example therefore shows a reflectance higher than 50%, providing a high-performance mirror mode.

Also, the reflective polarizers 13a and 13b each are disposed such that the transmission axis is at an azimuth angle of 90°. This configuration enables efficient production without deteriorating the area yield of the reflective polarizers.

In the present example, the λ/2 plate was prepared by uniaxially stretching a cycloolefinic polymer film (trade name: ZeonorFilm, manufactured by ZEON Corp.) to adjust the in-plane phase difference to 275 nm. Yet, the stretching method may be any stretching method that can give the desired phase difference. The multi-layer reflective polarizer (trade name: DBEF) manufactured by Sumitomo 3M Ltd. used in the present example has a transmission axis parallel to the machine direction of the rolled film. Hence, in order to laminate on the film a λ/2 plate that has a slow axis not parallel to the machine direction and forms a relative angle by a roll-to-roll attachment process, it is particularly preferred to employ oblique stretching which stretches the film in a direction oblique to the machine direction of the rolled film. The λ/2 plate may not be prepared by stretching a polymer film, and may be an applied retarder obtained by applying a liquid crystal material to a substrate film having been subjected to alignment treatment. The λ/2 plate may also be prepared by a method fixing the alignment; a method without any special alignment treatment on the substrate film; a method fixing the alignment, and then removing the film from the substrate film such that the film is transferred to another film; or a method applying a birefringent material other than a liquid crystal material to the substrate film. These methods can be used for the roll-to-roll attachment process with multi-layer reflective polarizers by performing alignment treatment on the substrate film in a direction oblique to the machine direction of the rolled substrate film, so that the production cost can be reduced.

For the azimuth angle (90°) of the transmission axis of the reflective polarizer 13a, the azimuth angle (5°) of the slow axis of the λ/2 plate 14a, the azimuth angle (90°) of the transmission axis of the reflective polarizer 13b, the azimuth angle (0°) of the transmission axis of the absorptive polarizer 10a, and the azimuth angle (90°) of the transmission axis of the absorptive polarizer 10b, the relationship among these azimuth angles is important and a shift of an azimuth angle from the set angle deteriorates the display quality. Still, a shift of an azimuth angle by about 3°, for example, may be accepted in practice. The same applies to the other examples.

EXAMPLE 1'

Figure 3:
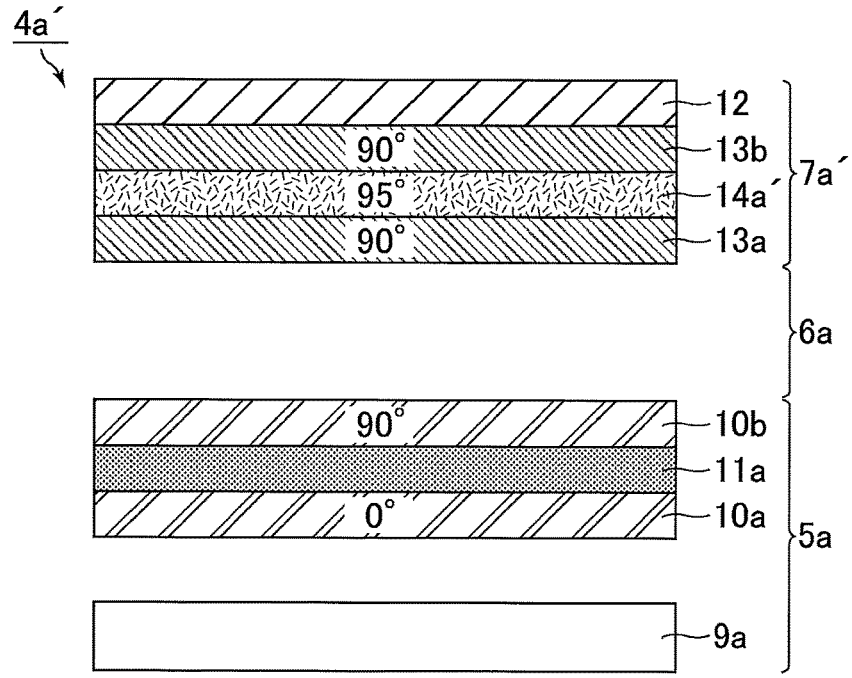
FIG. 3 is a schematic cross-sectional view illustrating the structure of a mirror display of Example 1'.

Example 1' relates to a mirror display including a liquid crystal display device, two reflective polarizers that serve as half mirror layers, and a λ/2 plate. The difference from Example 1 is that the slow axis of the λ/2 plate was at an azimuth angle of 95°. FIG. 3 is a schematic cross-sectional view illustrating the structure of a mirror display of Example 1'. As illustrated in FIG. 3, a half mirror plate 7a' of Example 1' includes, from the back-surface side to the viewer side, the reflective polarizer 13a (azimuth angle of transmission axis: 90°), a λ/2 plate 14a' (azimuth angle of slow axis: 95°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The mirror display 4a' of the present example can be driven in both the display mode and the mirror mode based on the following principles.

In the display mode, the liquid crystal panel 11a shows an image and a viewer observes the image on the liquid crystal panel 11a through the half mirror plate 7a'. The light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. The light having passed through the reflective polarizer 13a passes through the λ/2 plate 14a', and thereby the azimuth angle of the vibration is rotated. The linearly polarized light in the relative azimuth angle of φ passes through the λ/2 plate 14a' to be linearly polarized light in a relative azimuth angle of −φ. Light having passed through the λ/2 plate 14a' whose slow axis is at an azimuth angle of 95° therefore becomes linearly polarized light vibrating in an azimuth angle of 100°. In the definition of the axis azimuth angle, light vibrating in an azimuth angle of 100° and light vibrating in an azimuth angle of −80° are completely the same. The driving principles of the display mode and the mirror mode are the same as those in Example 1, and are thus not described here. The mirror display 4a' of Example 1' can also have a reflectance higher than 50%, provide display with a high luminance, and give excellent production efficiency. Since the mirror displays of Example 1 and Example 1' in which the slow axes of the respective retarders are different by 90° exhibit the same performance, whether the angle of the slow axis of each retarder is set to 5° or is set to 95° may be determined from the viewpoint of the production efficiency. Although the detailed setting is not described here, the same applies to the other examples.

EXAMPLE 2

Figure 4:
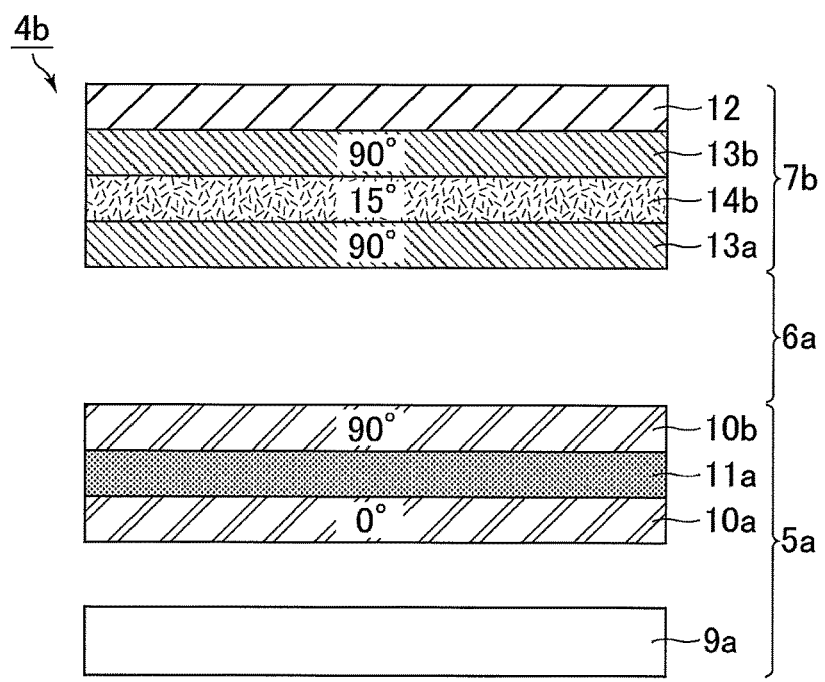
FIG. 4 is a schematic cross-sectional view illustrating the structure of a mirror display of Example 2.

Example 2 relates to a mirror display including a liquid crystal display device, two reflective polarizers that serve as half mirror layers, and a λ/2 plate. The difference from Example 1 is that the slow axis of the λ/2 plate was at an azimuth angle of 15°. FIG. 4 is a schematic cross-sectional view illustrating the structure of a mirror display of Example 2. As illustrated in FIG. 4, a half mirror plate 7b of Example 2 includes, from the back-surface side to the viewer side, the reflective polarizer 13a (azimuth angle of transmission axis: 90°), a λ/2 plate 14b (azimuth angle of slow axis: 15°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axis (azimuth angle: 90°) of the reflective polarizers 13a and 13b are substantially parallel to each other.

The driving principles of the display mode and the mirror mode are the same as those in Example 1 except for the azimuth angle of the slow axis of the λ/2 plate 14b, and are thus not described here. The mirror display 4b of Example 2 therefore also has a reflectance higher than 50%, provides display with a high luminance, and gives excellent production efficiency.

EXAMPLE 3

Figure 5:
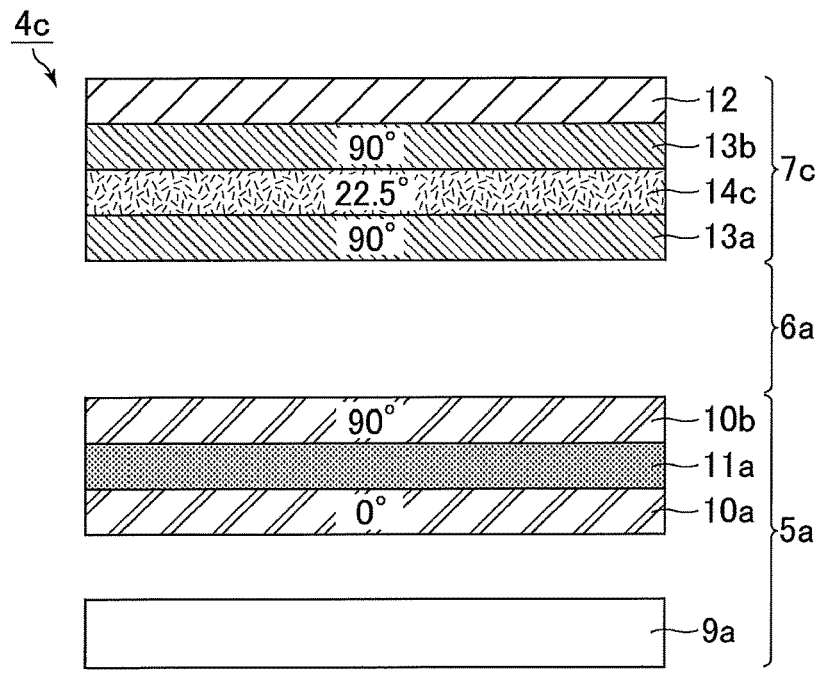
FIG. 5 is a schematic cross-sectional view illustrating the structure of a mirror display of Example 3.

Example 3 relates to a mirror display including a liquid crystal display device, two reflective polarizers that serve as half mirror layers, and a λ/2 plate. The difference from Example 1 is that the slow axis of the λ/2 plate was at an azimuth angle of 22.5°. FIG. 5 is a schematic cross-sectional view illustrating the structure of a mirror display of Example 3. As illustrated in FIG. 5, a half mirror plate 7c of Example 3 includes, from the back-surface side to the viewer side, the reflective polarizer 13a (azimuth angle of transmission axis: 90°), a λ/2 plate 14c (azimuth angle of slow axis: 22.5°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 1 except for the azimuth angle of the slow axis of the λ/2 plate 14c, and are thus not described here. The mirror display 4c of Example 3 therefore also has a reflectance higher than 50%, provides display with a high luminance, and gives excellent production efficiency.

EXAMPLE 3'

Figure 6:
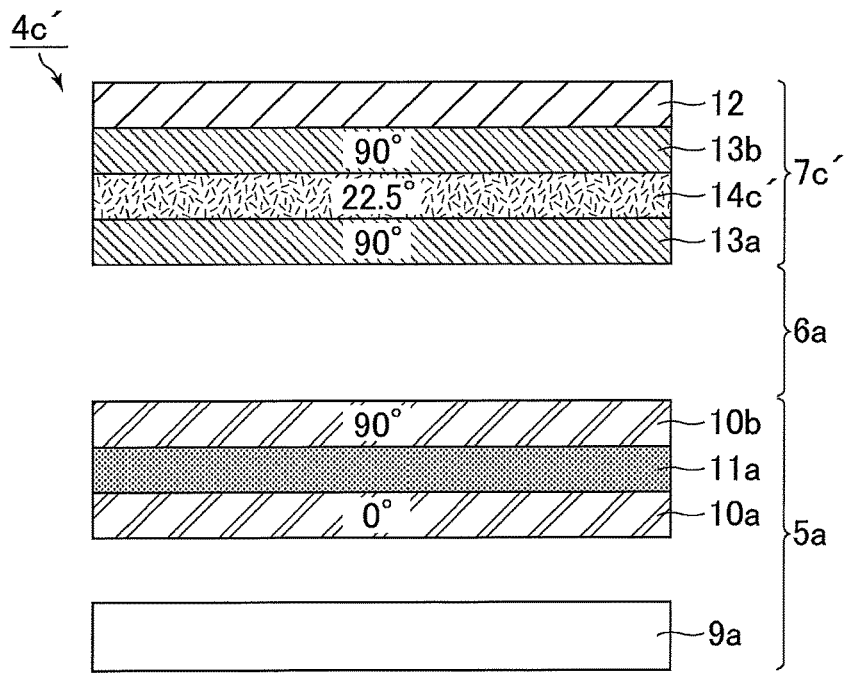
FIG. 6 is a schematic cross-sectional view illustrating the structure of a mirror display of Example 3'.

Example 3' relates to a mirror display including a liquid crystal display device, two reflective polarizers that serve as half mirror layers, and a λ/2 plate. The difference from Example 3 is that the λ/2 plate prepared by uniaxially stretching a cycloolefinic polymer film (trade name: ZeonorFilm, manufactured by ZEON Corp.) was replaced by an applied retarder prepared by subjecting an unstretched cycloolefinic polymer film to rubbing alignment to set the slow axis at an azimuth angle of 22.5° and applying a liquid crystal material to the film. FIG. 6 is a schematic cross-sectional view illustrating the structure of a mirror display of Example 3'. As illustrated in FIG. 6, a half mirror plate 7c' of Example 3' includes, from the back-surface side to the viewer side, the reflective polarizer 13a (azimuth angle of transmission axis: 90°), a λ/2 plate 14c' (azimuth angle of slow axis: 22.5°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 3 except for the material of the λ/2 plate, and are thus not described here. The mirror display 4c' of Example 3' therefore also has a reflectance higher than 50%, provides display with a high luminance, and gives excellent production efficiency.

EXAMPLE 3"

Figure 7:
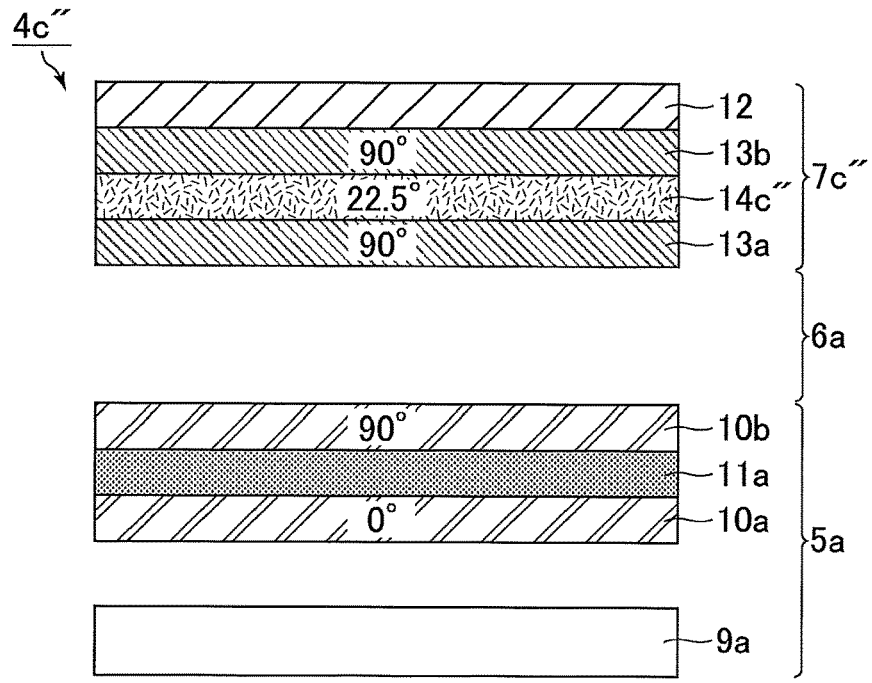
FIG. 7 is a schematic cross-sectional view illustrating the structure of a mirror display of Example 3".

Example 3" relates to a mirror display including a liquid crystal display device, two reflective polarizers that serve as half mirror layers, and a λ/2 plate. The difference from Example 3 is that the λ/2 plate prepared by uniaxially stretching a cycloolefinic polymer film (trade name: ZeonorFilm, manufactured by ZEON Corp.) was replaced by a polycarbonate resin retarder whose slow axis was at an azimuth angle of 22.5°. FIG. 7 is a schematic cross-sectional view illustrating the structure of a mirror display of Example 3". As illustrated in FIG. 7, a half mirror plate 7c" of Example 3" includes, from the back-surface side to the viewer side, the reflective polarizer 13a (azimuth angle of transmission axis: 90°), a λ/2 plate 14c" (azimuth angle of slow axis: 22.5°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 3 except for the material of the λ/2 plate, and are thus not described here. The mirror display 4c" of Example 3" therefore also has a reflectance higher than 50%, provides display with a high luminance, and gives excellent production efficiency.

EXAMPLE 4

Figure 8:
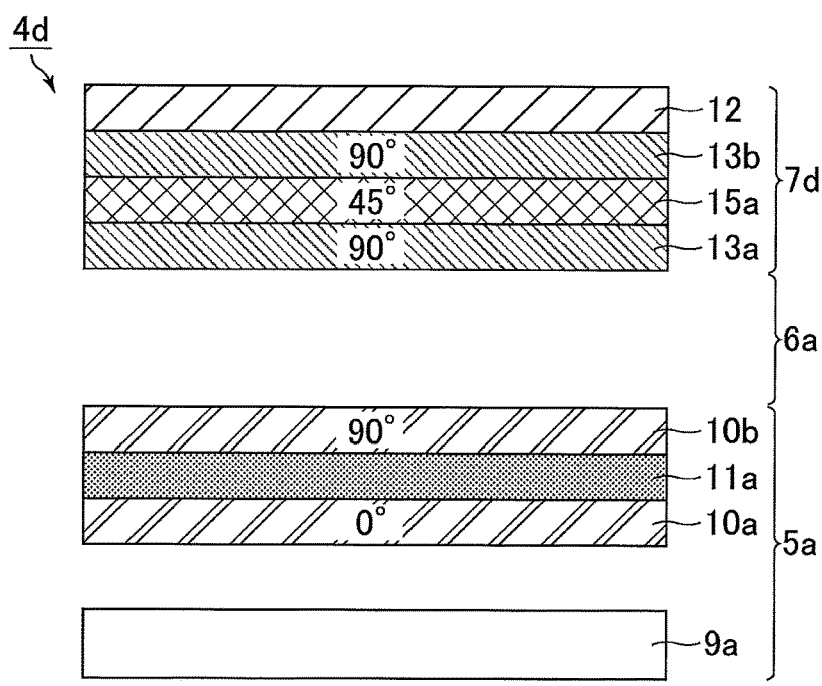
FIG. 8 is a schematic cross-sectional view illustrating the structure of a mirror display of Example 4.

Example 4 relates to a mirror display including a liquid crystal display device, two reflective polarizers that serve as half mirror layers, and a retarder. The difference from Example 1 is that instead of disposing the λ/2 plate 14a to set the slow axis at an azimuth angle of 5°, a retarder with a phase difference different from that of the λ/2 plate 14a is disposed such that the slow axis of the retarder was at an azimuth angle other than 5°. FIG. 8 is a schematic cross-sectional view illustrating the structure of a mirror display of Example 4. As illustrated in FIG. 8, a half mirror plate 7d of Example 4 includes, from the back-surface side to the viewer side, the reflective polarizer 13a (azimuth angle of transmission axis: 90°), a retarder 15a, the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The retarder 15a used was prepared by uniaxially stretching a cycloolefinic polymer film (trade name: ZeonorFilm, manufactured by ZEON Corp.) to adjust the in-plane phase difference to 60 nm. The retarder 15a was disposed such that the slow axis was at an azimuth angle of 45°.

Each of the glass plate 12, the reflective polarizers 13a and 13b, and the retarder 15a may be extended to the portion corresponding to the frame region B in FIG. 1.

The mirror display 4d of the present example can be driven in both the display mode and the mirror mode based on the following principles.

In the display mode, the light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. The light having passed through the reflective polarizer 13a passes through the retarder 15a, and thereby the ellipticity and the azimuth angle of the main axis of the polarized light may be changed. In the present example in which the retarder 15a has an in-plane phase difference of 60 nm and has the slow axis at an azimuth angle of 45°, the linearly polarized light with an ellipticity of 0 before passing through the retarder 15a becomes elliptically polarized light with an ellipticity of 0.35 after passing through the retarder 15a. At this time, the azimuth angle of the main axis does not change. Meanwhile, the transmission axis of the reflective polarizer 13b is at an azimuth angle of 90°. Here, the elliptically polarized light can be divided into a linearly polarized light component vibrating in an azimuth angle of 0° and a linearly polarized light component vibrating in an azimuth angle perpendicular to the above component, i.e., an azimuth angle of 90°. Thus, when elliptically polarized light is incident on the reflective polarizer 13b whose transmission axis is at an azimuth angle of 90°, the linearly polarized light component vibrating in an azimuth angle of 90° can pass through the reflective polarizer. As a result, the mirror display 4d of the present example can show an image with a high luminance even though it includes the half mirror plate 7d.

In the mirror mode, most of the linearly polarized light components vibrating in an azimuth angle of 0° among the light components incident on the half mirror plate 7d from the viewer side are reflected on the reflective polarizer 13b whose transmission axis is at an azimuth angle of 90°, in other words, whose reflection axis is at an azimuth angle of 0°.

The linearly polarized light components vibrating in an azimuth angle of 90° among the light components incident on the half mirror plate 7d from the viewer side pass through the reflective polarizer 13b whose transmission axis is at an azimuth angle of 90°. The ellipticity of the light having passed through the reflective polarizer 13b is changed by the retarder 15a, and some of the light components are reflected on the reflective polarizer 13a. The reflected light passes through the retarder 15a again, so that the polarization state is changed. Then, some of the light components having passed through the retarder 15a can pass through the reflective polarizer 13b. The mirror display 4d of the present example therefore shows a reflectance higher than 50%, providing a high-performance mirror mode.

Also, the reflective polarizers 13a and 13b each are disposed such that the transmission axis is at an azimuth angle of 90°. This configuration enables efficient production without deteriorating the area yield of the reflective polarizers.

In the present example, the retarder was prepared by uniaxially stretching a cycloolefinic polymer film (trade name: ZeonorFilm, manufactured by ZEON Corp.) to adjust the in-plane phase difference to 60 nm. Yet, the stretching method may be any stretching method that can give the desired phase difference. The multi-layer reflective polarizer (trade name: DBEF) manufactured by Sumitomo 3M Ltd. used in the present example has a transmission axis parallel to the machine direction of the rolled film. Hence, in order to laminate on the film a retarder that has a slow axis not parallel to the machine direction and forms a relative angle by a roll-to-roll attachment process, it is particularly preferred to employ oblique stretching which stretches the film in a direction oblique to the machine direction of the rolled film. In particular, in the case of adjusting the in-plane phase difference of the retarder to 140 nm as in the later-described Example 5, an obliquely stretched λ/4 plate which has been practically used in production of a circular polarizer is suitable. The retarder may not be prepared by stretching a polymer film, and may be an applied retarder obtained by applying a liquid crystal material to a substrate film having been subjected to alignment treatment. The retarder may also be prepared by a method fixing the alignment; a method without any special alignment treatment on the substrate film; a method fixing the alignment, and then removing the film from the substrate film such that the film is transferred to another film; or a method applying a birefringent material other than a liquid crystal material to the substrate film. These methods can be used for the roll-to-roll attachment process with multi-layer reflective polarizers by performing alignment treatment on the retarder in a direction oblique to the machine direction of the rolled substrate film, so that the production cost can be reduced.

EXAMPLE 5

Figure 9:
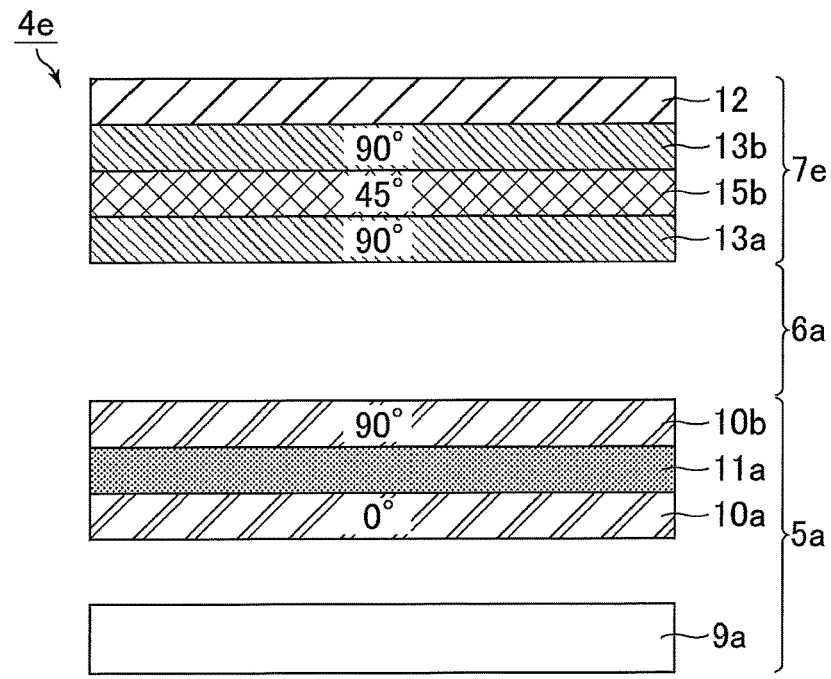
FIG. 9 is a schematic cross-sectional view illustrating the structure of a mirror display of Example 5.

Example 5 relates to a mirror display including a liquid crystal display device, two reflective polarizers that serve as half mirror layers, and a retarder. The difference from Example 4 is that the in-plane phase difference of the retarder was set to 140 nm (=λ/4) by oblique stretching. FIG. 9 is a schematic cross-sectional view illustrating the structure of a mirror display of Example 5. As illustrated in FIG. 9, a half mirror plate 7e of Example 5 includes, from the back-surface side to the viewer side, the reflective polarizer 13a (azimuth angle of transmission axis: 90°), a retarder 15b (azimuth angle of slow axis: 45°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 4 except for the in-plane phase difference of the retarder 15b, i.e., except that the light having passed through the retarder 15b becomes circularly polarized light. Thus, the driving principles are not described here. The mirror display 4e of Example 5 therefore also has a reflectance higher than 50%, provides display with a high luminance, and gives excellent production efficiency. In the present example in which the in-plane phase difference was set to 140 nm (λ/4), the retarder 15b can be an obliquely stretched λ/4 plate (e.g. ZD film manufactured by Zeon Corp.) commercially available for production of circular polarizers. In this case, the production efficiency is particularly excellent.

EXAMPLE 5'

Figure 10:
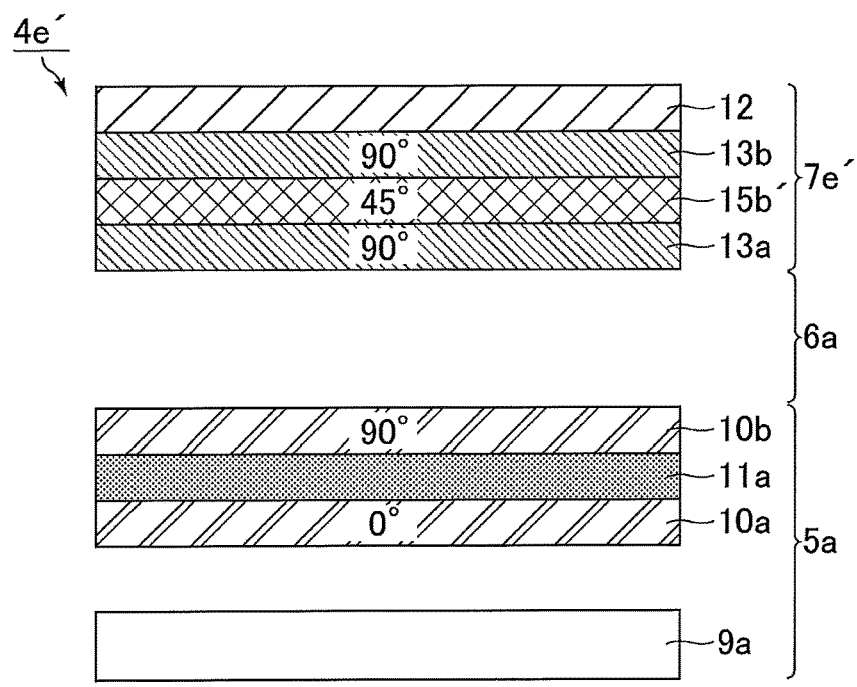
FIG. 10 is a schematic cross-sectional view illustrating the structure of a mirror display of Example 5'.

Example 5' relates to a mirror display including a liquid crystal display device, two reflective polarizers that serve as half mirror layers, and a retarder. The difference from Example 5 is that the λ/4 plate prepared by uniaxially stretching a cycloolefinic polymer film (trade name: ZeonorFilm, manufactured by ZEON Corp.) was replaced by a modified polycarbonate retarder (retarder for reverse wavelength dispersion, trade name: PURE-ACE (registered trademark), manufactured by Teijin Chemicals Limited.) whose slow axis was at an azimuth angle of 45°. FIG. 10 is a schematic cross-sectional view illustrating the structure of a mirror display of Example 5'. As illustrated in FIG. 10, a half mirror plate 7e' of Example 5' includes, from the back-surface side to the viewer side, the reflective polarizer 13a (azimuth angle of transmission axis: 90°), a retarder 15b' (azimuth angle of slow axis: 45°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 5 except for the material of the λ/4 plate, and are thus not described here. The mirror display 4e' of Example 5' therefore also has a reflectance higher than 50%, provides display with a high luminance, and gives excellent production efficiency.

EXAMPLE 5"

Figure 11:
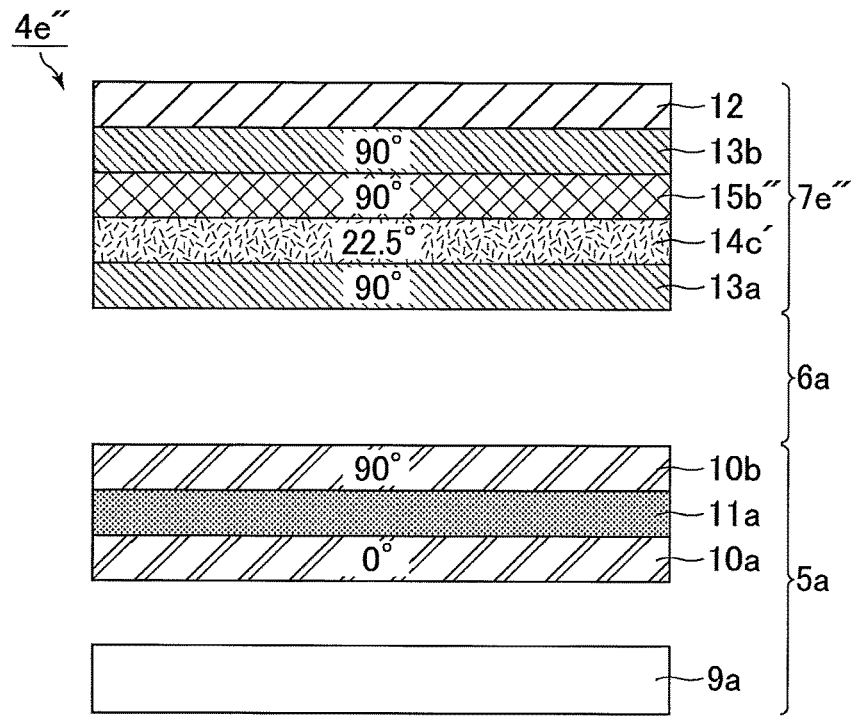
FIG. 11 is a schematic cross-sectional view illustrating the structure of a mirror display of Example 5".

Example 5" relates to a mirror display including a liquid crystal display device, two reflective polarizers that serve as half mirror layers, and a retarder. The difference from Example 5 is that the retarder 15b whose slow axis is at an azimuth angle of 45° was replaced by a laminate of applied retarders, namely an applied retarder (λ/2 plate 14c') obtained by subjecting an unstretched cycloolefinic polymer film to rubbing alignment to set the slow axis at an azimuth angle of 22.5° and applying a liquid crystal material to the film; and an applied retarder (retarder 15b") obtained by subjecting an unstretched cycloolefinic polymer film to rubbing alignment to set the slow axis at an azimuth angle of 90° and applying a liquid crystal material to the film. The in-plane phase difference of the λ/2 plate 14c' was 275 nm (=λ/2), and the in-plane phase difference of the retarder 15b" was 140 nm (=λ/4). The laminate of the λ/2 plate whose slow axis is at an azimuth angle of 22.5° and the λ/4 plate whose slow axis is at 90° is known to serve as a λ/4 plate for reverse wavelength dispersion that converts linearly polarized light in an azimuth angle of 90° into circularly polarized light, similarly to a λ/4 plate for reverse wavelength dispersion whose slow axis is at an azimuth angle of 45°. The laminate therefore can substantially convert all the light components at wavelengths of R, G, and B into circularly polarized light components. FIG. 11 is a schematic cross-sectional view illustrating the structure of a mirror display of Example 5″. As illustrated in FIG. 11, a half mirror plate 7e″ of Example 5″ includes, from the back-surface side to the viewer side, the reflective polarizer 13a (azimuth angle of transmission axis: 90°), the λ/2 plate 14c' (azimuth angle of slow axis: 22.5°), the retarder 15b″ (azimuth angle of slow axis: 90°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 5 except for the configuration of the retarder, and are thus not described here. The mirror display 4e″ of Example 5″ therefore also has a reflectance higher than 50%, provides display with a high luminance, and gives excellent production efficiency.

EXAMPLE 6

Figure 12:
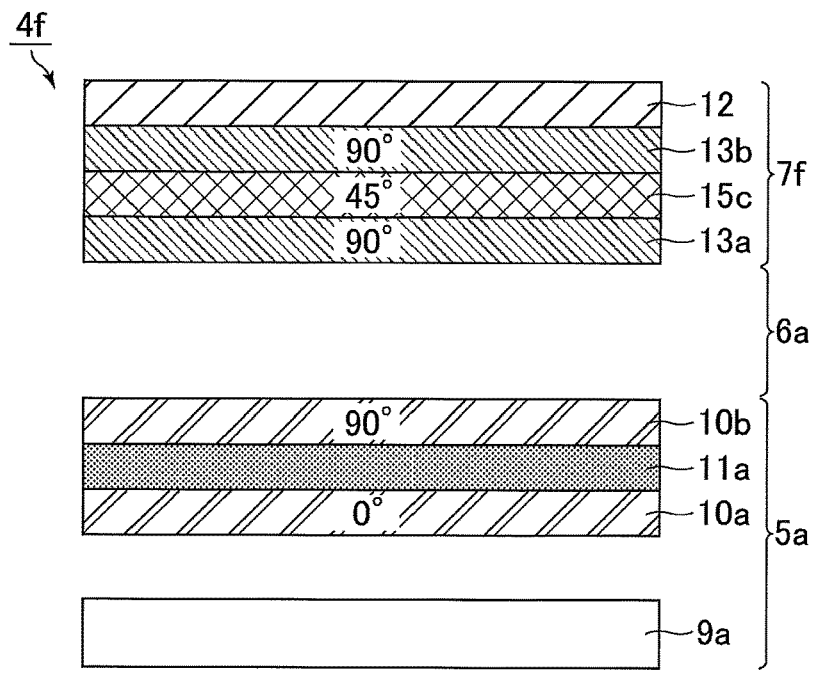
FIG. 12 is a schematic cross-sectional view illustrating the structure of a mirror display of Example 6.

Example 6 relates to a mirror display including a liquid crystal display device, two reflective polarizers that serve as half mirror layers, and a retarder. The difference from Example 4 is that the in-plane phase difference of the retarder was 200 nm. FIG. 12 is a schematic cross-sectional view illustrating the structure of a mirror display of Example 6. As illustrated in FIG. 12, a half mirror plate 7f of Example 6 includes, from the back-surface side to the viewer side, the reflective polarizer 13a (azimuth angle of transmission axis: 90°), a retarder 15c (azimuth angle of slow axis: 45°), the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The driving principles of the display mode and the mirror mode are the same as those in Example 4 except for the in-plane phase difference of the retarder 15c, and are thus not described here. The mirror display 4f of Example 6 therefore also has a reflectance higher than 50%, provides display with a high luminance, and gives excellent production efficiency.

EXAMPLE 7

Figure 13:
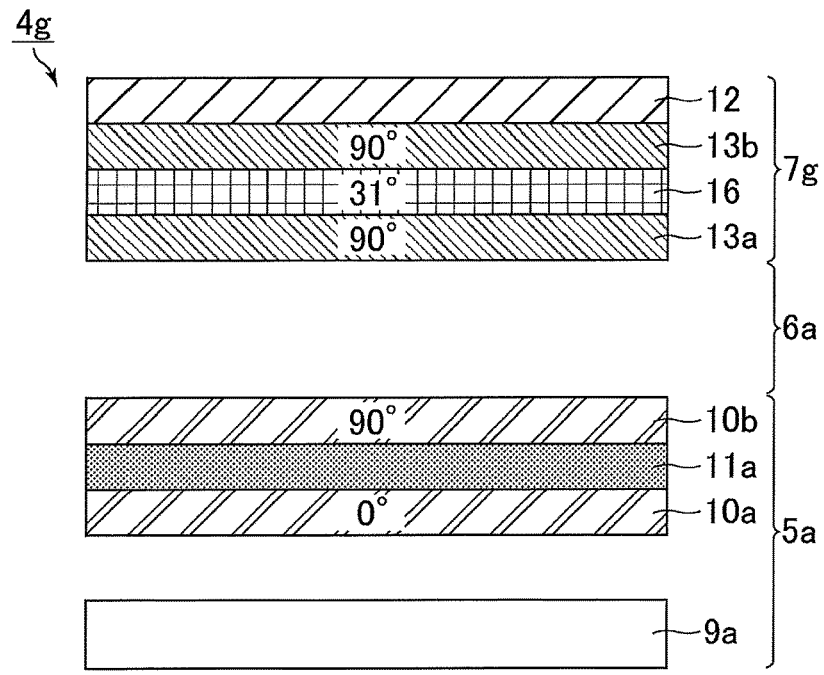
FIG. 13 is a schematic cross-sectional view illustrating the structure of a mirror display of Example 7.

Example 7 relates to a mirror display including a liquid crystal display device, two reflective polarizers that serve as half mirror layers, and a retarder. The difference from Example 1 is that the λ/2 plate 14a was replaced by a polyethylene terephthalate (PET) film. FIG. 13 is a schematic cross-sectional view illustrating the structure of a mirror display of Example 7. As illustrated in FIG. 13, a half mirror plate 7g of Example 7 includes, from the back-surface side to the viewer side, the reflective polarizer 13a (azimuth angle of transmission axis: 90°), a PET film 16, the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The PET film 16 used was a biaxially stretched PET film manufactured by Mitsubishi Plastics, Inc. (trade name: DIA-FOIL T100-50). The in-plane phase difference of the PET film 16 was 872 nm. The biaxial stretching is accompanied by a bowing phenomenon which puts the slow axis at an azimuth angle of 31° from the machine direction of the film. The PET film was cut into a rectangle with sides parallel to the machine direction and sides perpendicular to the machine direction. The cutout film was used as the PET film 16 (azimuth angle of slow axis: 31°). The bowing phenomenon is a phenomenon that in the case of biaxial stretching by a tenter stretching method, the film is stretched more obliquely at portions closer to the ends of the film. The bowing phenomenon occurs because the stretching at the ends of the film held by stretching clips is different from the stretching at the film center portion not held by clips.

Each of the glass plate 12, the reflective polarizers 13a and 13b, and the PET film 16 may be extended to the portion corresponding to the frame region B in FIG. 1.

The mirror display 4g of the present example can be driven in both the display mode and the mirror mode based on the following principles.

In the display mode, the light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. The light having passed through the reflective polarizer 13a passes through the PET film 16, and thereby the ellipticity of the polarized light is changed. That is, the light having passed through the PET film 16 is changed into elliptically polarized light. Meanwhile, the reflective polarizer 13b is disposed such that the transmission axis is at an azimuth angle of 90°. Here, the elliptically polarized light can be divided into a linearly polarized light component vibrating in an azimuth angle of 0° and a linearly polarized light component vibrating in an azimuth angle perpendicular to the above component, i.e., an azimuth angle of 90°. Thus, when elliptically polarized light is incident on the reflective polarizer 13b whose transmission axis is at an azimuth angle of 90°, the linearly polarized light component vibrating in an azimuth angle of 90° can pass through the reflective polarizer. As a result, the mirror display 4g of the present example can show an image with a high luminance even though it includes the half mirror plate 7g.

In the mirror mode, most of the linearly polarized light components vibrating in an azimuth angle of 0° among the light components incident on the half mirror plate 7g from the viewer side are reflected on the reflective polarizer 13b whose transmission axis is at an azimuth angle of 90°, in other words, whose reflection axis is at an azimuth angle of 0°.

The linearly polarized light components vibrating in an azimuth angle of 90° among the light components incident on the half mirror plate 7g from the viewer side pass through the reflective polarizer 13b whose transmission axis is at an azimuth angle of 90°. The ellipticity of the light having passed through the reflective polarizer 13b is changed by the PET film 16, and some of the light components are reflected on the reflective polarizer 13a. The reflected light passes through the PET film 16 again, so that the polarization state is changed. Then, some of the light components having passed through the PET film 16 can pass through the reflective polarizer 13b. The mirror display 4g of the present example therefore shows a reflectance higher than 50%, providing a high-performance mirror mode.

Also, the reflective polarizers 13a and 13b each are disposed such that the transmission axis is at an azimuth angle of 90°. This configuration enables efficient production without deteriorating the area yield of the reflective polarizers. PET films are mass-produced to be used as protective films for optical films, and are therefore more inexpensive than the other retarders. Also, since the slow axis of the phase difference is not parallel to the machine direction of the rolled film due to the bowing phenomenon, the film can be subjected to the roll-to-roll attachment process with the multi-layer reflective polarizers without special oblique stretching. Thereby, the production cost can be suppressed.

EXAMPLE 8

Figure 14:
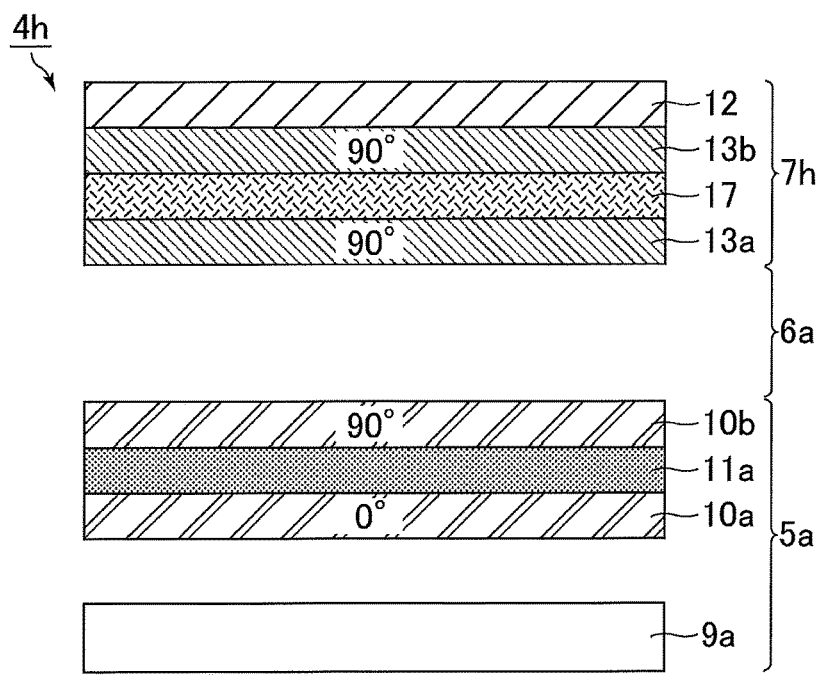
FIG. 14 is a schematic cross-sectional view illustrating the structure of a mirror display of Example 8.

Example 8 relates to a mirror display including a liquid crystal display device, two reflective polarizers that serve as half mirror layers, and a depolarization layer. The difference from Example 1 is that the λ/2 plate 14a was replaced by a diffusion adhesive layer (depolarization layer). FIG. 14 is a schematic cross-sectional view illustrating the structure of a mirror display of Example 8. As illustrated in FIG. 14, a half mirror plate 7h of Example 8 includes, from the back-surface side to the viewer side, the reflective polarizer 13a (azimuth angle of transmission axis: 90°), a diffusion adhesive layer 17, the reflective polarizer 13b (azimuth angle of transmission axis: 90°), and the glass plate 12. The reflective polarizer 13b and the glass plate 12 were bonded with an acrylic pressure-sensitive adhesive (not illustrated). The transmission axis (azimuth angle: 0°) of the absorptive polarizer 10a and the transmission axes (azimuth angle: 90°) of the reflective polarizers 13a and 13b are substantially perpendicular to each other. The transmission axis (azimuth angle: 90°) of the absorptive polarizer 10b and the transmission axes (azimuth angle: 90°) of the reflective polarizers 13a and 13b are substantially parallel to each other.

The diffusion adhesive layer 17 can be an adhesive having a light diffusing function attributed to a light diffuser such as fine particles in the adhesive. In the present example, the diffusion adhesive layer 17 was obtained by adding silica-based transparent uncolored particles having a refractive index of 1.43 and an average particle size of 4 μm to an acrylic adhesive. The layer had a haze of 61.8%.

Each of the glass plate 12, the reflective polarizers 13a and 13b, and the diffusion adhesive layer 17 may be extended to the portion corresponding to the frame region B in FIG. 1.

The mirror display 4h of the present example can be driven in both the display mode and the mirror mode based on the following principles.

In the display mode, the light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. The light having passed through the reflective polarizer 13a passes through the diffusion adhesive layer 17, and thereby the azimuth angle of the vibration and the ellipticity of the light are changed. That is, light having passed through the diffusion adhesive layer 17 is usually elliptically polarized light. Meanwhile, the reflective polarizer 13b is disposed such that the transmission axis is at an azimuth angle of 90°. Here, the elliptically polarized light can be divided into a linearly polarized light component vibrating in an azimuth angle of 0° and a linearly polarized light component vibrating in an azimuth angle perpendicular to the above component, i.e., an azimuth angle of 90°. Thus, when elliptically polarized light is incident on the reflective polarizer 13b whose transmission axis is at an azimuth angle of 90°, the linearly polarized light component vibrating in an azimuth angle of 90° can pass through the reflective polarizer. As a result, the mirror display 4h of the present example can show an image with a high luminance even though it includes the half mirror plate 7h.

In the mirror mode, most of the linearly polarized light components vibrating in an azimuth angle of 0° among the light components incident on the half mirror plate 7h from the viewer side are reflected on the reflective polarizer 13b whose transmission axis is at an azimuth angle of 90°, in other words, whose reflection axis is at an azimuth angle of 0°.

The linearly polarized light components vibrating in an azimuth angle of 90° among the light components incident on the half mirror plate 7h from the viewer side pass through the reflective polarizer 13b whose transmission axis is at an azimuth angle of 90°. The ellipticity of the light having passed through the reflective polarizer 13b is changed by the diffusion adhesive layer 17, and some of the light components are reflected on the reflective polarizer 13a. The reflected light passes through the diffusion adhesive layer 17 again, so that the polarization state is changed. Then, some of the light components having passed through the diffusion adhesive layer 17 can pass through the reflective polarizer 13b. The mirror display 4h of the present example therefore shows a reflectance higher than 50%, providing a high-performance mirror mode.

Also, the reflective polarizers 13a and 13b each are disposed such that the transmission axis is at an azimuth angle of 90°. This configuration enables efficient production without deteriorating the area yield of the reflective polarizers.

The diffusion adhesive layer 17 was used as a depolarization layer disposed between the two reflective polarizers 13a and 13b in the present example. Here, the diffusion adhesive layer 17 may be replaced by any other depolarization layer that can change the azimuth angle of the vibration and the ellipticity of the light having passed through the reflective polarizer 13a.

EXAMPLE 9

Example 9 relates to a mirror display including a liquid crystal display device and two reflective polarizers that serve as half mirror layers. The difference from Example 1 is that the λ/2 plate 14a was not disposed, and the reflective polarizer 13b was replaced by a reflective polarizer (hereinafter, also referred to as a ChLC selective reflection layer)

Figure 15:
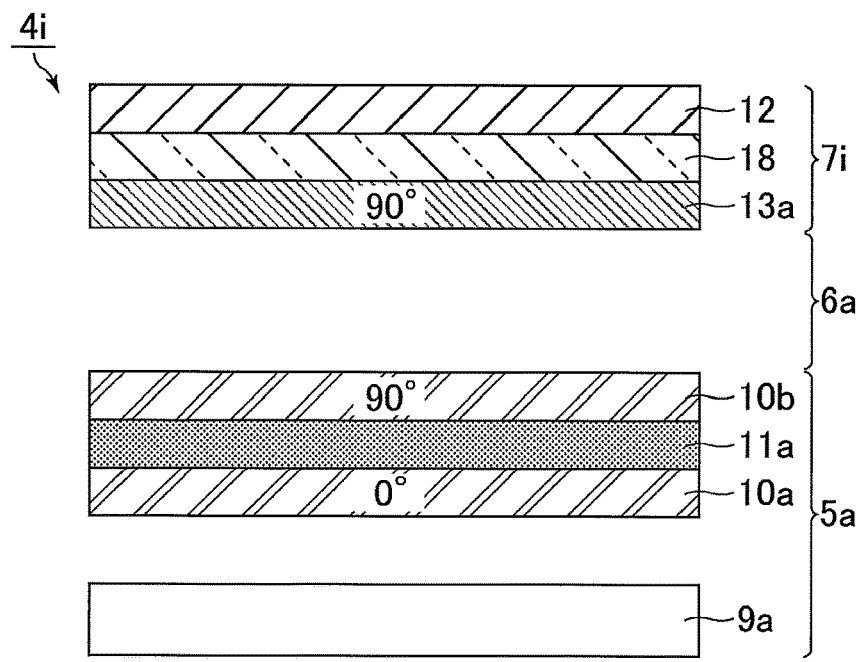
FIG. 15 is a schematic cross-sectional view illustrating the structure of a mirror display of Example 9.

18 utilizing the selective reflection of cholesteric liquid crystal. FIG. 15 is a schematic cross-sectional view illustrating the structure of a mirror display of Example 9. As illustrated in FIG. 15, a half mirror plate 7i of Example 9 includes, from the back-surface side to the viewer side, the reflective polarizer 13a (azimuth angle of transmission axis: 90°), the ChLC selective reflection layer 18, and the glass plate 12. The respective components were bonded with an acrylic pressure-sensitive adhesive (not illustrated). The transmission axis (azimuth angle: 0°) of the absorptive polarizer 10a and the transmission axis (azimuth angle: 90°) of the reflective polarizer 13a are substantially perpendicular to each other. The transmission axis (azimuth angle: 90°) of the absorptive polarizer 10b and the transmission axis (azimuth angle: 90°) of the reflective polarizer 13a are substantially parallel to each other.

The ChLC selective reflection layer 18 can be, for example, a circularly polarized light separating film that utilizes the principle of selective reflection of the cholesteric liquid crystal layer. This film includes a liquid crystal layer in which the liquid crystalline groups in rod-like liquid crystal molecules or a side-chain liquid crystalline polymer are twisted in the thickness direction with a rotational axis that is a screw axis parallel to the normal direction of the layer. The ChLC selective reflection layer 18 utilizes the selective reflectivity of the liquid crystal layer to divide the right-left circularly polarized light components into a transmitted light component and a reflected light component. In the present example, a 4-μm-thick cholesteric liquid crystal layer was produced by the method disclosed in Example 3 of the above Patent Literature 7, and only the liquid crystal layer separated from the substrate was used. The ChLC selective reflection layer 18 was designed to reflect the left circularly polarized light and transmit right circularly polarized light. Examples of the ChLC selective reflection layer include the reflective polarizer (trade name: PCF) manufactured by Nitto Denko Corp.

Each of the glass plate 12, the ChLC selective reflection layer 18, and the reflective polarizer 13a may be extended to the portion corresponding to the frame region B in FIG. 1.

The mirror display 4i of the present example can be driven in both the display mode and the mirror mode based on the following principles.

In the display mode, the light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. Here, the linearly polarized light can be divided into a left circularly polarized light component and a right circularly polarized component. Thus, when linearly polarized light is incident on the ChLC selective reflection layer 18, the right circularly polarized light component can pass through the layer with hardly any loss, and the left circularly polarized light component is reflected. Here, the left circularly polarized light can be divided into a linearly polarized light component vibrating in an azimuth angle of 0° and a linearly polarized light component vibrating in an azimuth angle perpendicular to the above component, i.e., an azimuth angle of 90°. Since the transmission axis of the reflective polarizer 13a is at an azimuth angle of 90°, the linearly polarized light component vibrating in an azimuth angle of 0° is therefore reflected on the reflective polarizer 13a and travels to the ChLC selective reflection layer 18. The above process is then repeated, and some of the left circularly polarized light components reflected on the ChLC selective reflection layer 18 can pass through the ChLC selective reflection layer 18. As a result, the mirror display 4i of the present example can show an image with a high luminance even though it includes the half mirror plate 7i.

In the mirror mode, most of the left circularly polarized light components among the light components incident on the half mirror plate 7i from the viewer side are reflected on the ChLC selective reflection layer 18.

In contrast, the right circularly polarized light components among the light components incident on the half mirror plate 7i from the viewer side pass through the ChLC selective reflection layer 18. Some of the light components having passed through the ChLC selective reflection layer 18 are reflected on the reflective polarizer 13a, and some of the reflected light components can pass through the ChLC selective reflection layer 18. The mirror display 4i of the present example therefore shows a reflectance higher than 50%, providing a high-performance mirror mode.

Also, since the present example utilizes only one multi-layer reflective polarizer, the area yield of the reflective polarizer does not deteriorate, and the number of components constituting the half mirror plate is smaller. Therefore, the mirror display can be manufactured efficiently.

EXAMPLE 10

Figure 16:
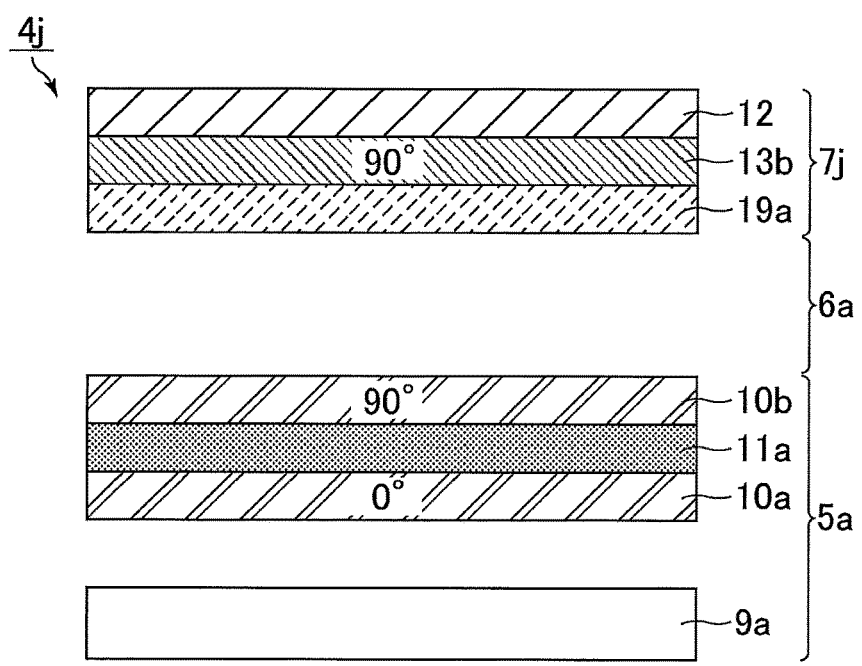
FIG. 16 is a schematic cross-sectional view illustrating the structure of a mirror display of Example 10.

Example 10 relates to a mirror display including a liquid crystal display device, one reflective polarizer that serves as a half mirror layer, and a dielectric multi-layer film. The difference from Example 1 is that the λ/2 plate 14a was not disposed, and the reflective polarizer 13a was replaced by a dielectric multi-layer film 19a. FIG. 16 is a schematic cross-sectional view illustrating the structure of a mirror display of Example 10. As illustrated in FIG. 16, a half mirror plate 7j of Example 10 includes, from the back-surface side to the viewer side, the dielectric multi-layer film 19a, the reflective polarizer 13b (azimuth angle of transmission axis: 90°), and the glass plate 12. The respective components were bonded with an acrylic pressure-sensitive adhesive (not illustrated). The transmission axis (azimuth angle: 0°) of the absorptive polarizer 10a and the transmission axis (azimuth angle: 90°) of the reflective polarizer 13b are substantially perpendicular to each other. The transmission axis (azimuth angle: 90°) of the absorptive polarizer 10b and the transmission axis (azimuth angle: 90°) of the reflective polarizer 13b are substantially parallel to each other.

The dielectric multi-layer film 19a can be a laminate which is formed from many dielectric thin films with different refractive indexes and which serves as a mirror whose reflectance was controlled to the desired value based on the principle of light interference. Examples thereof include multi-layer films obtained by alternately laminating titanium oxide ($TiO_2$) with a low refractive index and silicon dioxide ($SiO_2$) with a high refractive index. In the present example, Suncut (registered trademark) ΣClear (SKFC) manufactured by Asahi Glass Co., Ltd. controlled to have a reflectance of 40% and a transmittance of 60% was used.

Each of the glass plate 12, the reflective polarizer 13b, and the dielectric multi-layer film 19a may be extended to the portion corresponding to the frame region B in FIG. 1.

The mirror display 4j of the present example can be driven in both the display mode and the mirror mode based on the following principles.

In the display mode, the light emitted from the liquid crystal display device 5a is linearly polarized light vibrating in an azimuth angle of 90°, and the dielectric multi-layer film 19a is designed to have a reflectance of 40% and a transmittance of 60%. This means that 40% of the light is reflected on the dielectric multi-layer film 19a and 60% of the light passes through the dielectric multi-layer film 19a in the same polarized state. The light having passed through the dielectric multi-layer film 19a can pass through the reflective polarizer 13b whose transmission axis is at an azimuth angle of 90° with hardly any loss.

In the mirror mode, most of the linearly polarized light components vibrating in an azimuth angle of 0° among the light components incident on the half mirror plate 7j from the viewer side are reflected on the reflective polarizer 13b whose transmission axis is at an azimuth angle of 90°, in other words, whose reflection axis is at an azimuth angle of 0°.

The linearly polarized light components vibrating in an azimuth angle of 90° among the light components incident on the half mirror plate 7j from the viewer side pass through the reflective polarizer 13b whose transmission axis is at an azimuth angle of 90°. A proportion of 40% of the light having passed through the reflective polarizer 13b is reflected on the dielectric multi-layer film 19a designed to have a reflectance of 40% and a transmittance of 60%. Here, since the light is maintained as linearly polarized light vibrating in an azimuth angle of 90°, the light can pass through the reflective polarizer 13b. The mirror display 4j of the present example therefore shows a reflectance higher than 50%, providing a high-performance mirror mode.

Also, since the present example utilizes only one multi-layer reflective polarizer, the area yield of the reflective polarizer does not deteriorate, and the number of components constituting the half mirror plate is smaller. Therefore, the mirror display can be manufactured efficiently.

EXAMPLE 11

Figure 17:
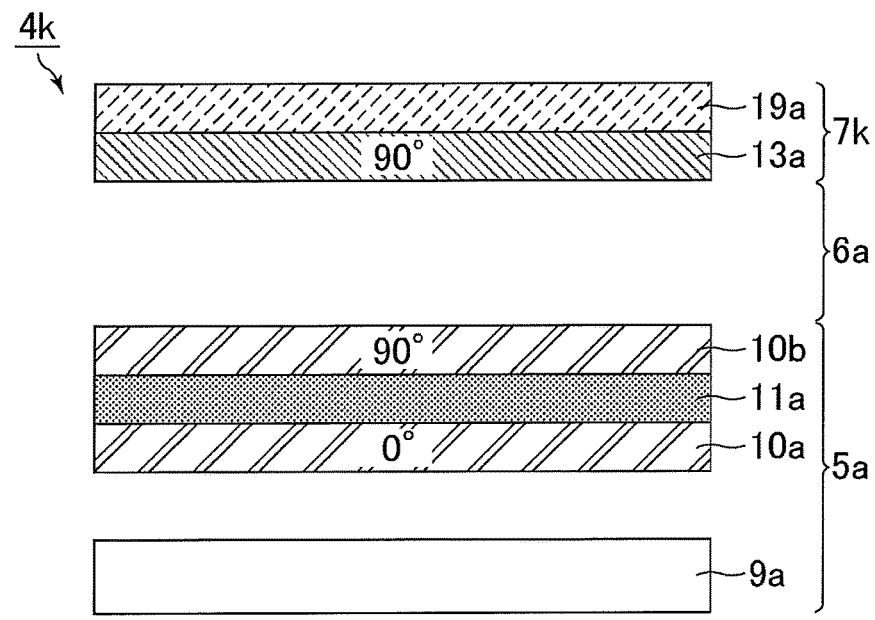
FIG. 17 is a schematic cross-sectional view illustrating the structure of a mirror display of Example 11.

Example 11 relates to a mirror display including a liquid crystal display device, one reflective polarizer that serves as a half mirror layer, and a dielectric multi-layer film. The difference from Example 10 is that the lamination order of the dielectric multi-layer film and the reflective polarizer constituting the half mirror layer was reversed. FIG. 17 is a schematic cross-sectional view illustrating the structure of a mirror display of Example 11. As illustrated in FIG. 17, a half mirror plate 7k of Example 11 includes, from the back-surface side to the viewer side, the reflective polarizer 13a (azimuth angle of transmission axis: 90°) and the dielectric multi-layer film 19a. The respective components were bonded with an acrylic pressure-sensitive adhesive (not illustrated). Since the dielectric multi-layer film 19a used in each of Examples 10 and 11 included a 6-mm-thick glass plate as the base material, the glass plate 12 used in Example 10 was eliminated in the present example. Here, the glass plate 12 may not be eliminated and may be used to provide the reliability and strength of the display device. Even in this case, the same effects can be achieved. The transmission axis (azimuth angle: 0°) of the absorptive polarizer 10a and the transmission axis (azimuth angle: 90°) of the reflective polarizer 13a are substantially perpendicular to each other. The transmission axis (azimuth angle: 90°) of the absorptive polarizer 10b and the transmission axis (azimuth angle: 90°) of the reflective polarizer 13a are substantially parallel to each other.

Each of the dielectric multi-layer film 19a and the reflective polarizer 13a may be extended to the portion corresponding to the frame region B in FIG. 1.

The mirror display 4k of the present example can be driven in both the display mode and the mirror mode based on the following principles.

In the display mode, the light emitted from the liquid crystal display device 5a is linearly polarized light vibrating in an azimuth angle of 90°, while the transmission axis of the reflective polarizer 13a is at an azimuth angle of 90°. Thus, the light can pass through the reflective polarizer 13a with hardly any loss. The dielectric multi-layer film 19a has a reflectance of 40% and a transmittance of 60%, and 40% of the light having passed through the reflective polarizer 13a is reflected on the dielectric multi-layer film 19a while 60% of the light passes through the dielectric multi-layer film 19a. As a result, the mirror display 4k of the present example can show an image with a high luminance even though it includes the half mirror plate 7k.

In the mirror mode, 40% of the light incident on the half mirror plate 7k from the viewer side is reflected on the dielectric multi-layer film 19a having a reflectance of 40% and a transmittance of 60%, and 60% of the light passes through the dielectric multi-layer film 19a. About a half of the light components having passed through the dielectric multi-layer film 19a is reflected on the reflective polarizer 13a. Then, 60% of the reflected light components passes through the dielectric multi-layer film 19a while 40% of the reflected light is reflected on the dielectric multi-layer film 19a in the same polarized state to travel again to the reflective polarizer 13a. The above process is then repeated, and some of the light components reflected on the reflective polarizer 13a can pass through the dielectric multi-layer film 19a. The mirror display 4k of the present example therefore shows a reflectance higher than 50%, providing a high-performance mirror mode.

Also, since the present example utilizes only one multi-layer reflective polarizer, the area yield of the reflective polarizer does not deteriorate, and the number of components constituting the half mirror plate is smaller. Therefore, the mirror display can be manufactured efficiently.

If part of the mirror region which serves as a mirror surface in the mirror mode of the mirror display of each of the above examples is a frame region, the mirror region in the mirror mode can have a larger area than the display region in the display mode. Thus, the frame region can effectively be used to improve the utility as a mirror. Furthermore, mirror displays whose frame region can also serve as a mirror may have better design quality in the display mode.

REFERENCE EXAMPLE 1

Figure 18:
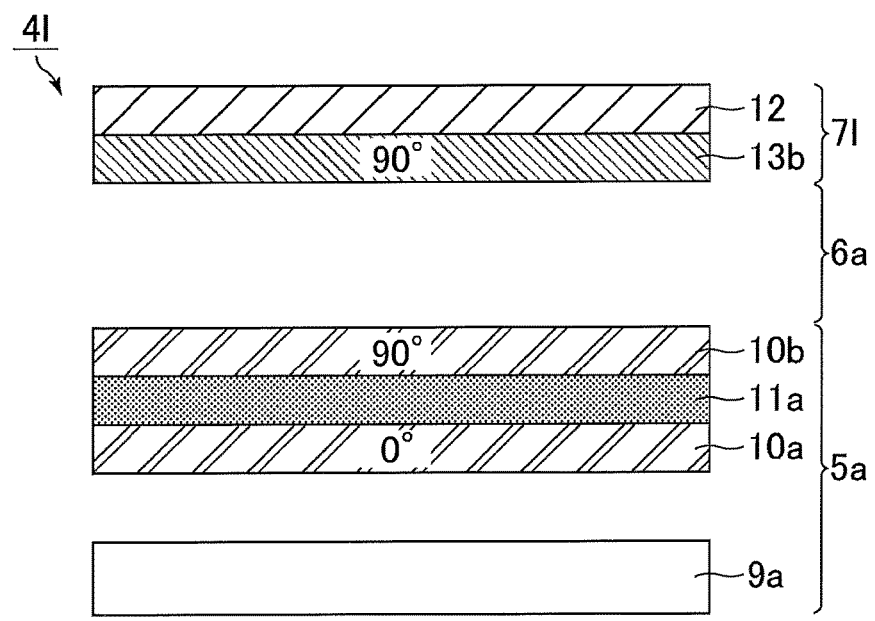
FIG. 18 is a schematic cross-sectional view illustrating the structure of a mirror display of Reference Example 1.

Reference Example 1 relates to a mirror display including a liquid crystal display device and one reflective polarizer that serves as a half mirror layer. The difference from Example 1 is that the λ/2 plate 14a and the reflective polarizer 13a are not disposed. FIG. 18 is a schematic cross-sectional view illustrating the structure of a mirror display of Reference Example 1. As illustrated in FIG. 18, a half mirror plate 7l of Reference Example 1 includes, from the back-surface side to the viewer side, the reflective polarizer 13b (azimuth angle of transmission axis: 90°) and the glass plate 12. The respective components were bonded with an acrylic pressure-sensitive adhesive (not illustrated).

The mirror display 4l of the present reference example can be driven in both the display mode and the mirror mode based on the following principles.

In the display mode, the light emitted from the liquid crystal display device 5a is linearly polarized light vibrating in an azimuth angle of 90°, while the transmission axis of the reflective polarizer 13b is at an azimuth angle of 90°. Thus, the light can pass through the reflective polarizer 13b with hardly any loss. As a result, the mirror display 41 of the present reference example can show an image with a high luminance even though it includes the half mirror plate 71.

In the mirror mode, most of the linearly polarized light components vibrating in an azimuth angle of 0° among the light components incident on the half mirror plate 71 from the viewer side are reflected on the reflective polarizer 13b whose transmission axis is at an azimuth angle of 90°, in other words, whose reflection axis is at an azimuth angle of 0°.

However, the light is reflected only on one reflective polarizer in the mirror display 41 of the present reference example. The reflectance in the mirror mode is lower than that in the mirror displays of the examples described above. Hence, the mirror performance can still be improved.

COMPARATIVE EXAMPLE 1

Figure 19:
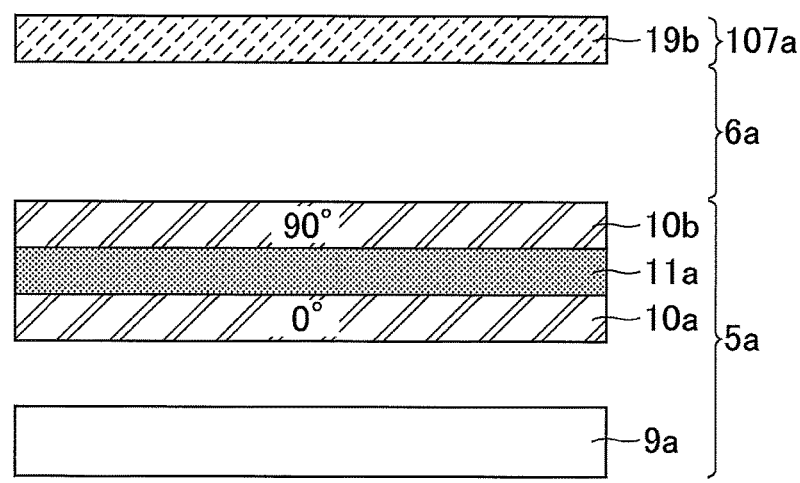
FIG. 19 is a schematic cross-sectional view illustrating the structure of a mirror display of Comparative Example 1.

Comparative Example 1 relates to a mirror display including a liquid crystal display device and a dielectric multi-layer film that serves as a half mirror layer. The difference from Example 1 is that the glass plate 12, the λ/2 plate 14a, and the reflective polarizers 13a and 13b were not disposed, but a dielectric multi-layer film 19b was disposed. FIG. 19 is a schematic cross-sectional view illustrating the structure of a mirror display of Comparative Example 1. As illustrated in FIG. 19, a half mirror plate 107a of Comparative Example 1 is the dielectric multi-layer film 19b.

The dielectric multi-layer film 19b used was a dielectric multi-layer film (trade name: H264) manufactured by Shibuya Optical Co., Ltd. which was adjusted to have a reflectance of 70% and a transmittance of 30%. The dielectric multi-layer film 19b was obtained using a 1-mm-thick glass plate as the base material, and unlike the above example, the film was not integrated with the glass plate 12.

The mirror display 104a of the present comparative example can be driven in both the display mode and the mirror mode based on the following principles.

In the display mode, the light emitted from the liquid crystal display device 5a is linearly polarized light vibrating in an azimuth angle of 90°, and only some of the light components pass through the dielectric multi-layer film 19b. This is because the dielectric multi-layer film does not have the polarization selectivity that the reflective polarizers have.

In the mirror mode, some of the light components incident on the half mirror plate 107a from the viewer side are reflected on the dielectric multi-layer film 19b that serves as a mirror.

Yet, the mirror display 104a of the present comparative example does not use a reflective polarizer, and the transmittance in the display mode is lower than that in the mirror displays of the examples described above. Hence, the display performance can still be improved.

COMPARATIVE EXAMPLE 2

Figure 20:
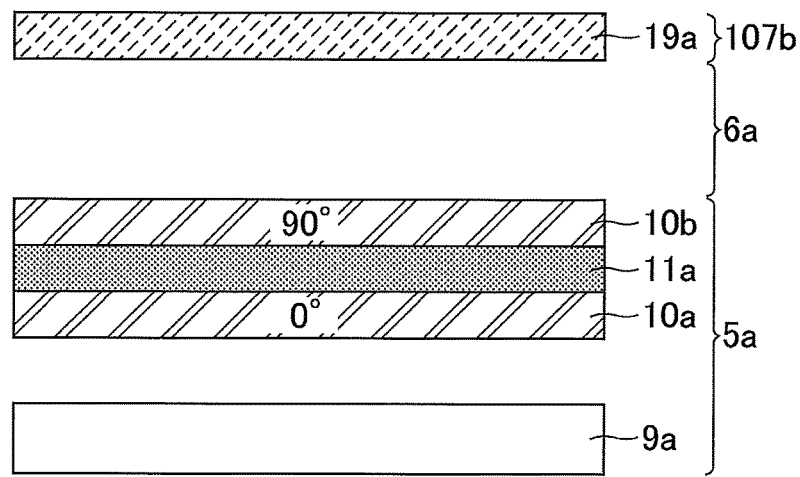
FIG. 20 is a schematic cross-sectional view illustrating the structure of a mirror display of Comparative Example 2.

Comparative Example 2 relates to a mirror display including a liquid crystal display device and a dielectric multi-layer film that serves as a half mirror layer. The difference from Comparative Example 1 is that the dielectric multi-layer film 19b was replaced by the dielectric multi-layer film 19a. FIG. 20 is a schematic cross-sectional view illustrating the structure of a mirror display of Comparative Example 2.

As illustrated in FIG. 20, a half mirror plate 107b of Comparative Example 2 is the dielectric multi-layer film 19a.

The dielectric multi-layer film 19a used was SKFC manufactured by Asahi Glass Co., Ltd. which was adjusted to have a reflectance of 40% and a transmittance of 60%. The dielectric multi-layer film 19a was obtained using a 6-mm-thick glass plate as the base material, and unlike the above example, the film was not integrated with the glass plate 12.

The mirror display 104b of the present comparative example can be driven in both the display mode and the mirror mode based on the following principles.

In the display mode, the light emitted from the liquid crystal display device 5a is linearly polarized light vibrating in an azimuth angle of 90°, and some of the light components pass through the dielectric multi-layer film 19a.

In the mirror mode, only some of the light components incident on the half mirror plate 107b from the viewer side are reflected on the dielectric multi-layer film 19a. This is because the dielectric multi-layer film does not have the polarization selectivity that the reflective polarizers have.

Yet, the mirror display 104b of the present comparative example does not use a reflective polarizer, and the reflectance in the mirror mode is lower than that in the mirror displays of the examples described above. Hence, the mirror performance can still be improved.

COMPARATIVE EXAMPLE 3

Figure 21:
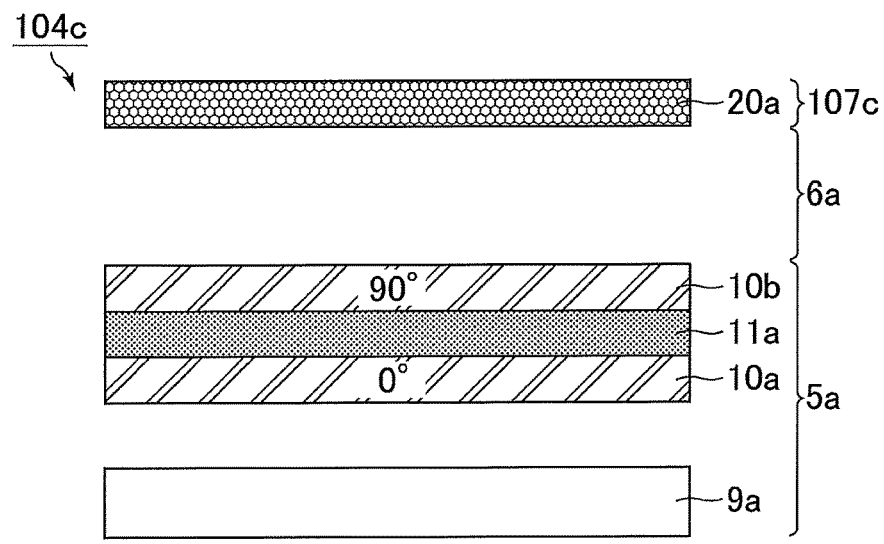
FIG. 21 is a schematic cross-sectional view illustrating the structure of a mirror display of Comparative Example 3.

Comparative Example 3 relates to a mirror display including a liquid crystal display device and a vapor-deposited metal film that serves as a half mirror layer. The difference from Example 1 is that the glass plate 12, the λ/2 plate 14a, and the reflective polarizers 13a and 13b were not disposed, but a vapor-deposited metal film 20a was disposed. FIG. 21 is a schematic cross-sectional view illustrating the structure of a mirror display of Comparative Example 3. As illustrated in FIG. 21, a half mirror plate 107c of Comparative Example 3 is the vapor-deposited metal film 20a.

The vapor-deposited metal film 20 can be one in which a metal such as aluminum or chromium is deposited on a mirror, for example. In this case, the vapor-deposited metal film can be made to have transparency by setting the vapor deposition film thickness to be very thin. The vapor-deposited metal film used in the present comparative example had a reflectance of 40% and a transmittance of 20% by chromium vapor deposition. Here, since a vapor-deposited metal film is absorptive unlike a dielectric multi-layer film, the sum of the reflectance and the transmittance does not become 100%. Here, the vapor-deposited metal film 20a was obtained using a 1-mm-thick glass plate as the base material, and unlike the above example, the film was not integrated with the glass plate 12.

The mirror display 104c of the present comparative example can be driven in both the display mode and the mirror mode based on the following principles.

In the display mode, the light emitted from the liquid crystal display device 5a is linearly polarized light vibrating in an azimuth angle of 90°, and only some of the light components pass through the vapor-deposited metal film 20a. This is because the vapor-deposited metal film does not have the polarization selectivity that the reflective polarizers have, and the vapor-deposited metal film also has high absorptivity.

In the mirror mode, some of the light components incident on the half mirror plate 107c from the viewer side are reflected on the vapor-deposited metal film 20a, so that the mirror display serves as a mirror.

Yet, the mirror display 104c of the present comparative example has a lower transmittance in the display mode than the mirror displays of the above examples using reflective polarizers and the mirror display of Comparative Example 1 using a dielectric multi-layer film. Hence, the display performance can still be improved.

COMPARATIVE EXAMPLE 4

Figure 22:
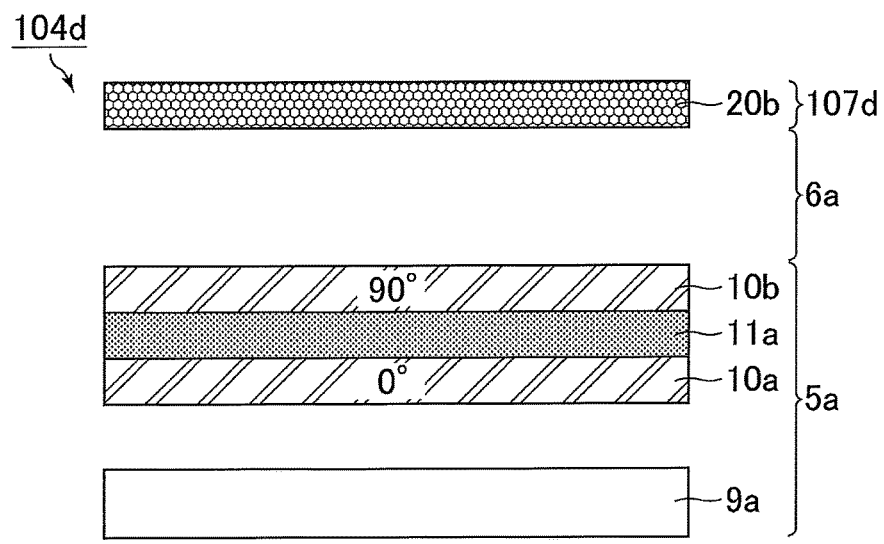
FIG. 22 is a schematic cross-sectional view illustrating the structure of a mirror display of Comparative Example 4.

Comparative Example 4 relates to a mirror display including a liquid crystal display device and a vapor-deposited metal film that serves as a half mirror layer. The difference from Comparative Example 3 is that the vapor-deposited metal film 20a was replaced by a vapor-deposited metal film 20b. FIG. 22 is a schematic cross-sectional view illustrating the structure of a mirror display of Comparative Example 4. As illustrated in FIG. 22, a half mirror plate 107d of Comparative Example 4 is the vapor-deposited metal film 20b.

The vapor-deposited metal film 20b used was a vapor-deposited metal film adjusted to have a reflectance of 50% and a transmittance of 10% by chromium vapor deposition. The vapor-deposited metal film 20b was obtained using a 1-mm-thick glass plate as the base material, and unlike the above example, the film was not integrated with the glass plate 12.

The mirror display 104d of the present comparative example can be driven in both the display mode and the mirror mode based on the following principles.

In the display mode, the light emitted from the liquid crystal display device 5a is linearly polarized light vibrating in an azimuth angle of 90°, and only some of the light components pass through the vapor-deposited metal film 20b. This is because the vapor-deposited metal film does not have the polarization selectivity that the reflective polarizers have, and the vapor-deposited metal film also has high absorptivity.

In the mirror mode, some of the light components incident on the half mirror plate 107d from the viewer side are reflected on the vapor-deposited metal film 20b, so that the mirror display serves as a mirror.

Yet, the mirror display 104d of the present comparative example has a lower transmittance in the display mode than the mirror displays of the above examples using reflective polarizers and the mirror display of Comparative Example 1 using a dielectric multi-layer film. Hence, the display performance can still be improved.

COMPARATIVE EXAMPLE 5

Figure 23:
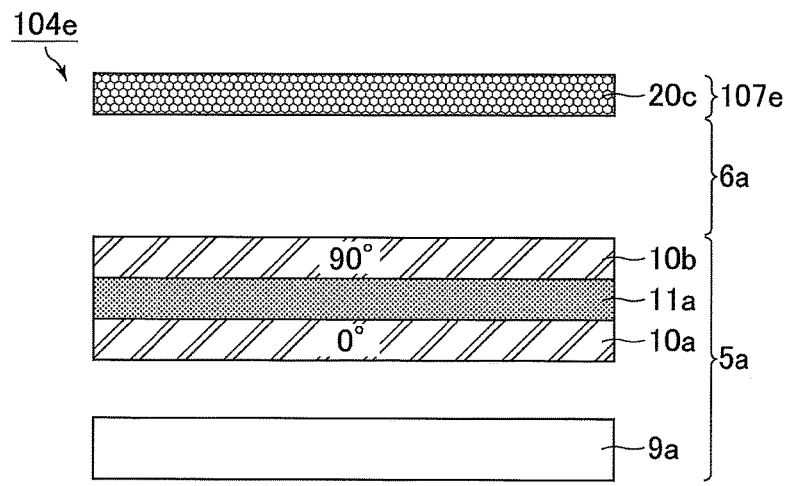
FIG. 23 is a schematic cross-sectional view illustrating the structure of a mirror display of Comparative Example 5.

Comparative Example 5 relates to a mirror display including a liquid crystal display device and a vapor-deposited metal film that serves as a half mirror layer. The difference from Comparative Example 3 is that the vapor-deposited metal film 20a was replaced by a vapor-deposited metal film 20c. FIG. 23 is a schematic cross-sectional view illustrating the structure of a mirror display of Comparative Example 5. As illustrated in FIG. 23, a half mirror plate 107e of Comparative Example 5 is the vapor-deposited metal film 20c.

The vapor-deposited metal film 20c used was a vapor-deposited metal film adjusted to have a reflectance of 55% and a transmittance of 5% by chromium vapor deposition. The vapor-deposited metal film 20c was obtained using a 1-mm-thick glass plate as the base material, and unlike the above example, the film was not integrated with the glass plate 12.

The mirror display 104e of the present comparative example can be driven in both the display mode and the mirror mode based on the following principles.

In the display mode, the light emitted from the liquid crystal display device 5a is linearly polarized light vibrating in an azimuth angle of 90°, and only some of the light components pass through the vapor-deposited metal film 20c. This is because the vapor-deposited metal film does not have the polarization selectivity that the reflective polarizers have, and the vapor-deposited metal film also has high absorptivity.

In the mirror mode, some of the light components incident on the half mirror plate 107e from the viewer side are reflected on the vapor-deposited metal film 20c, so that the mirror display serves as a mirror.

Yet, the mirror display 104e of the present comparative example has a lower transmittance in the display mode than the mirror displays of the above examples using reflective polarizers and the mirror display of Comparative Example 1 using a dielectric multi-layer film. Hence, the display performance can still be improved.

[Evaluation Results of Mirror Displays]

For the mirror displays of Examples 1 to 11, Reference Example 1, and Comparative Examples 1 to 5, (1) the transmittance in the display mode, (2) the reflectance in the mirror mode, and (3) the sum of the transmittance in the display mode and the reflectance in the mirror mode are summarized in Table 1.

The transmittance in the display mode was determined by measuring the screen luminance of white display of a liquid crystal display device in a darkroom, and standardizing the measured value based on the white-screen luminance (defined as 100%) of a liquid crystal display device (trade name: LC-20F5, manufactured by Sharp Corp.) commonly used in the examples. The measurement device used was a spectroradiometer (trade name: SR-UL1) manufactured by Topcon Corp. The Y value after visibility correction was taken as the luminance.

The reflectance in the mirror mode is a reflectance of a liquid crystal display device showing a black screen (in the power-off state). The measurement device used was a portable spectrophotometer (trade name: CM-2600d, range of measurement wavelength: 360 nm to 740 nm, integrating sphere type) manufactured by Konica Minolta, Inc. The reflection measurement mode was a specular component included (SCI) mode. In the SCI mode, both the diffuse-reflected light and the specular-reflected light are measured, and the reflectance of light including the specular-reflected light is measured.

TABLE 1

|  | Transmittance in display mode (%) | Reflectance in mirror mode (%) | Sum of transmittance in display mode and reflectance in mirror mode (%) |
| --- | --- | --- | --- |
| Example 1 | 87.5 | 58.0 | 145.5 |
| Example 1' | 87.5 | 58.0 | 145.5 |
| Example 2 | 76.9 | 62.4 | 139.3 |
| Example 3 | 57.3 | 71.2 | 128.5 |
| Example 3' | 57.2 | 71.5 | 128.7 |
| Example 3" | 57.0 | 71.1 | 128.1 |
| Example 4 | 85.0 | 59.0 | 144.0 |
| Example 5 | 60.1 | 69.3 | 129.4 |
| Example 5' | 60.5 | 70.1 | 130.6 |

TABLE 1-continued

| | Transmittance in display mode (%) | Reflectance in mirror mode (%) | Sum of transmittance in display mode and reflectance in mirror mode (%) |
|---|---|---|---|
| Example 5" | 60.8 | 71.2 | 132.0 |
| Example 6 | 32.1 | 82.6 | 114.7 |
| Example 7 | 77.9 | 62.9 | 140.8 |
| Example 8 | 84.6 | 56.9 | 141.5 |
| Example 9 | 67.2 | 67.1 | 134.3 |
| Example 10 | 55.2 | 70.4 | 125.6 |
| Example 11 | 55.3 | 69.6 | 124.9 |
| Reference Example 1 | 89.9 | 55.1 | 145.0 |
| Comparative Example 1 | 31.1 | 68.1 | 99.2 |
| Comparative Example 2 | 58.8 | 41.1 | 99.9 |
| Comparative Example 3 | 20.8 | 39.9 | 60.7 |
| Comparative Example 4 | 9.9 | 51.1 | 61.0 |
| Comparative Example 5 | 5.5 | 55.2 | 60.7 |

The subjective evaluation shows that the mirror displays of Examples 1 to 11 and Reference Example 1 each achieved a sufficient screen luminance in the display mode, and sufficient display performance. Furthermore, the mirror displays of Examples 1 to 11 and Reference Example 1 were each evaluated as of practical use as a mirror. Especially the mirror displays of Examples 1 to 11 were found to be visually bright mirrors. In particular, the mirror displays of Examples 3, 3', 3", 5, 5', 5", 6, 9, 10, and 11 having a reflectance of higher than 65% in the mirror mode were visually equal to a normal mirror (reflectance: about 80%) which is not a mirror display. Also, each of the mirror displays of Examples 1 to 11 and Reference Example 1 showed a sum of the transmittance in the display mode and the reflectance in the mirror mode of much higher than 100%, and thus showed generally excellent performance even though the display performance and the mirror performance are in the trade-off relation.

In contrast, the mirror display of Comparative Example 1 was found to be practicable as a mirror, but had low screen luminance in the display mode and insufficient display performance. The mirror displays of Comparative Examples 2 to 5 were insufficient in one or both of the display performance and the mirror performance. The mirror displays of Comparative Examples 1 to 5 each showed a sum of the transmittance in the display mode and the reflectance in the mirror mode of lower than 100%, and these mirror displays were generally inferior to the mirror displays of the respective examples in terms of the performance.

Figure 24:
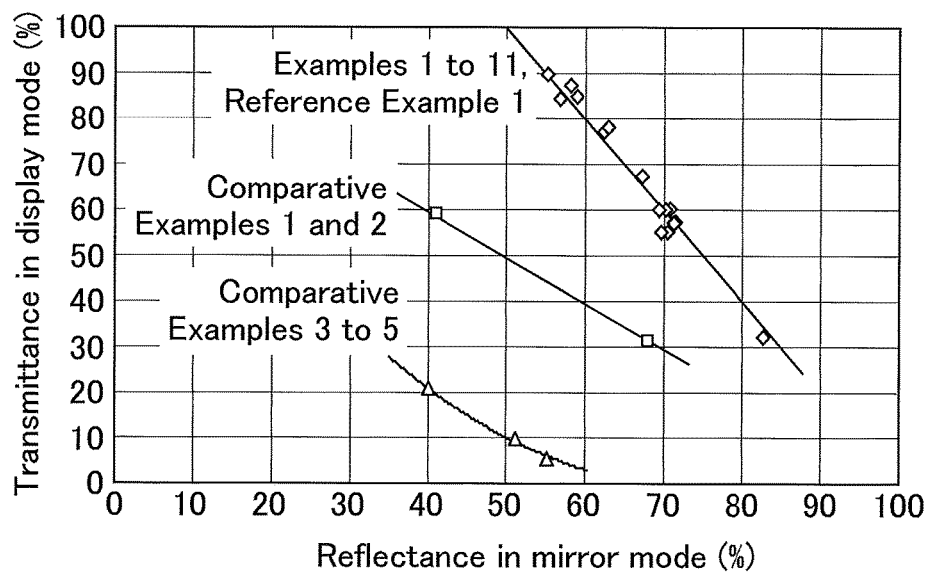
FIG. 24 is a graph showing the transmittances in the display mode and the reflectances in the mirror mode in the mirror displays of Examples 1 to 11, Reference Example 1, and Comparative Examples 1 to 5.

The contents of Table 1 are summarized in FIG. 24. FIG. 24 is a graph showing the transmittances in the display mode and the reflectances in the mirror mode in the mirror displays of Examples 1 to 11, Reference Example 1, and Comparative Examples 1 to 5. FIG. 24 shows that at any reflectance, the transmittance of any of the mirror displays of Examples 1 to 11 (Reference Example 1) using at least one reflective polarizer is higher than that of any of the mirror displays of Comparative Examples 1 to 5 not using a reflective polarizer. FIG. 24 also shows that at any transmittance, the reflectance of any of the mirror displays of Examples 1 to 11 (Reference Example 1) using at least one reflective polarizer is higher than that of any of the mirror displays of Comparative Examples 1 to 5 not using a reflective polarizer.

Here, as the reflectance in the mirror mode is made closer to 100%, the limit value of the transmittance in the display mode theoretically becomes 0% in all of Examples 1 to 11, Reference Example 1, and Comparative Examples 1 to 5. In contrast, as the reflectance in the mirror mode is made closer to 0%, the limit value of the transmittance in the display mode theoretically becomes 100%. However, in Examples 1 to 11 and Reference Example 1, the reflectance in the mirror mode cannot be brought significantly lower than 50%. If the reflectance in the mirror mode is made closer to 50%, the limit value of the transmittance in the display mode theoretically becomes 100%. As described above, the solid lines shown in FIG. 24 are approximated curves formed by interpolating or extrapolating the measured points based on the theoretic predictions.

Each of Example 3, Example 3', and Example 5 showed a reflectance of about 70% and a transmittance of about 60%. Yet, in detailed observation in subjective evaluation, the tints in white display in the display mode were different. That is, Example 3 and Example 3' showed little coloration, and Example 5 showed slight yellowing. The chromaticities (x, y) were measured using a spectroradiometer (trade name: SR-UL1) manufactured by Topcon Corp. The measurement showed the results as shown in the following Table 2, and the display mode in Example 3 and Example 3' showed the same chromaticity as in a liquid crystal display device (trade name: LC-20F5) not including a half mirror plate. In contrast, the display mode in Example 5 was found to show increasing chromaticities x and y, which means that the chromaticities shifted in the yellow direction.

TABLE 2

| | Chromaticity | |
|---|---|---|
| | x | y |
| Liquid crystal display device (trade name: LC-20F5) | 0.271 | 0.282 |
| Example 3 | 0.271 | 0.279 |
| Example 3' | 0.269 | 0.273 |
| Example 3" | 0.270 | 0.273 |
| Example 5 | 0.297 | 0.322 |
| Example 5' | 0.286 | 0.301 |
| Example 5" | 0.278 | 0.287 |

The difference in coloration can be explained by putting the polarization states before and after half mirror plate transmission in the display mode in the examples on the Poincare sphere.

Figure 25:
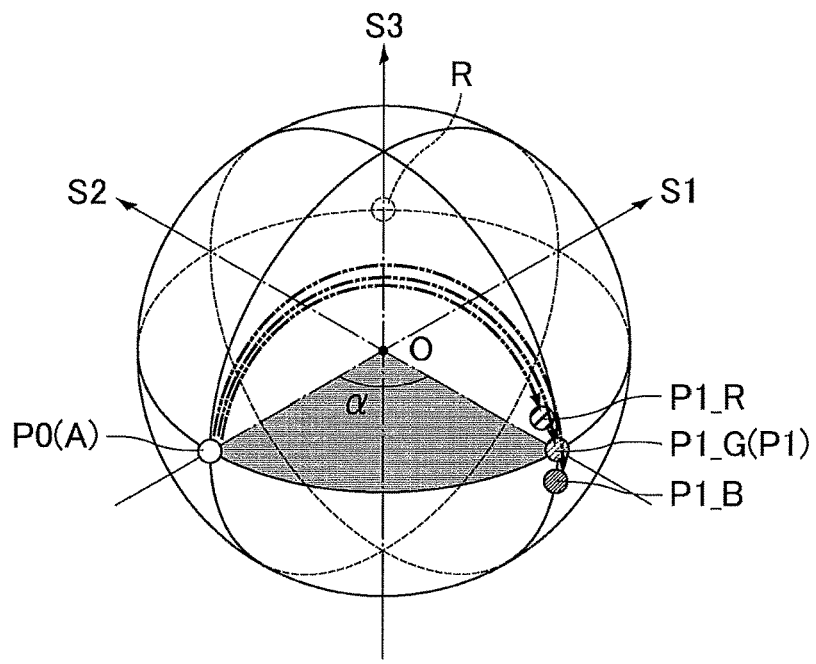
FIG. 25 is a view illustrating the polarization states before and after half mirror plate transmission in Example 3 and Example 3' on the Poincare sphere.

FIG. 25 is a view illustrating the polarization states before and after half mirror plate transmission in Example 3 and Example 3' on the Poincare sphere. The drawing may not be exact and may include points showing the polarization states which are slightly different from the actual points, for plain explanation. Right after the reflective polarizer 13a transmission, the point showing the polarization state is at the point P0 on the Poincare sphere. When the light passes through the λ/2 plate, the polarization state at the point P0 reaches the point P1 by rotation of λ/2, which is 180°, with the slow axis of the λ/2 plate (point R on the Poincare sphere) as the center of rotation. At this time, the rotational direction is counter clockwise in a view from the point R toward the origin O. The light then passes through the reflective polarizer 13b. The polarization state that is allowed to pass through the reflective polarizer 13b is at the point A (the same point as the point P0) on the Poincare sphere. Hence, the transmittance is determined by the central angle α of an arc that connects the point P1 and the point A. Specifically, the transmittance is proportional to (1+cos α).

The above description is in the case of monochromatic light at a wavelength of 550 nm, but applies to light at any other wavelength. However, the phase differences of the λ/2 plates are different at different wavelengths. Since the λ/2 plate of Example 3 includes a cycloolefinic polymer film, phase difference wavelength dispersion is comparatively small. When the phase difference is adjusted to 275 nm at a wavelength of 550 nm (Green: G), the phase difference at a wavelength of 450 nm (Blue: B) becomes 277 nm, and the phase difference at a wavelength of 650 nm (Red: R) becomes 273 nm. When these phase differences are divided by the respective wavelengths, the resulting values for B, G, and R are respectively 0.61, 0.50, and 0.42. The λ/2 plates of the present examples do not serve as λ/2 plates at wavelengths other than a wavelength of 550 nm, and the angles of rotation on the Poincare sphere for B, G, and R are respectively 219°, 180°, and 151°. Hence, the points P1_B, P1_G, and P1_R, which are the points P1 at the respective wavelengths, are slightly shifted. Still, as illustrated in FIG. 25, the points P1_B, P1_G, and P1_R are on a line that vertically crosses the equator of the Poincare sphere to which the point A belongs, which means that the wavelength dispersion of a is not very large. Therefore, the wavelength dispersion of the transmittance is not very large, and coloration in the transmissive display is low.

The λ/2 plate of Example 3' made of a liquid crystal material shows comparatively large phase difference wavelength dispersion. When the phase difference is adjusted to 275 nm at a wavelength of 550 nm (Green: G), the phase difference at a wavelength of 450 nm (Blue: B) becomes 288 nm, and the phase difference at a wavelength of 650 nm (Red: R) becomes 266 nm. When these phase differences are divided by the respective wavelengths, the resulting values for B, G, and R are respectively 0.64, 0.50, and 0.40. The λ/2 plates of the present examples do not exactly serve as λ/2 plates at wavelengths other than a wavelength of 550 nm, and the angles of rotation on the Poincare sphere for B, G, and R are respectively 230°, 180°, and 144°. Hence, the points P1_B, P1_G, and P1_R, which are the points P1 at the respective wavelengths, are slightly shifted. Still, as illustrated in FIG. 25, the points P1_B, P1_G, and P1_R are on a line that vertically crosses the equator of the Poincare sphere to which the point A belongs, which means that the wavelength dispersion of a is not very large. Therefore, the wavelength dispersion of the transmittance is not very large, and coloration in the transmissive display is low. As described above, the transmissive display of a half mirror plate including a λ/2 plate was found not to be easily affected by the wavelength dispersion of the retarder material.

Similarly to Example 3 and Example 3', the chromaticity in the display mode of the mirror display of Example 3" including a retarder made of a polycarbonate resin with even larger wavelength dispersion than in Example 3' was the same as that in a liquid crystal display device (trade name: LC-20F5) not including a half mirror plate.

Figure 26:
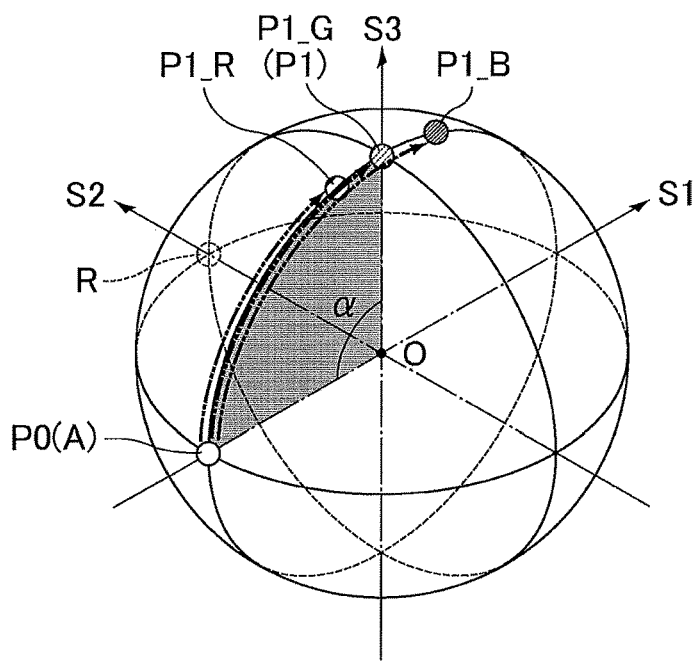
FIG. 26 is a view illustrating the polarization states before and after half mirror plate transmission in Example 5 on the Poincare sphere.

FIG. 26 is a view illustrating the polarization states before and after half mirror plate transmission in Example 5 on the Poincare sphere. Right after the reflective polarizer 13a transmission, the point showing the polarization state is at the point P0 on the Poincare sphere. When the light passes through the λ/4 plate, the polarization state at the point P0 reaches the point P1 by rotation of λ/4, which is 90°, with the slow axis of the λ/4 plate (point R on the Poincare sphere) as the center of rotation. At this time, the rotational direction is counter clockwise in a view from the point R toward the origin O. The light then passes through the reflective polarizer 13b. The polarization state that is allowed to pass through the reflective polarizer 13b is at the point A (the same point as the point P0) on the Poincare sphere. Hence, the transmittance is determined by the central angle α of an arc that connects the point P1 and the point A. Specifically, the transmittance is proportional to (1+cos α). The point P1 of Example 5 is at the North Pole and is greatly different from the point of Example 3 on the equator. Still, the a values of both cases are about 90°, which means that the half mirror plates in both of the examples have substantially the same transmittance.

The above description is in the case of monochromatic light at a wavelength of 550 nm, but applies to light at any other wavelength. However, the phase differences of the λ/4 plates are different at different wavelengths. Since the λ/4 plate of Example 5 includes a cycloolefinic polymer film, the phase difference wavelength dispersion is comparatively small. When the phase difference is adjusted to 140 nm at a wavelength of 550 nm (Green: G), the phase difference at a wavelength of 450 nm (Blue: B) becomes 141 nm, and the phase difference at a wavelength of 650 nm (Red: R) becomes 139 nm. When these phase differences are divided by the respective wavelengths, the resulting values for B, G, and R are respectively 0.31, 0.25, and 0.21. The λ/4 plates of the present examples do not exactly serve as λ/4 plates at wavelengths other than a wavelength of 550 nm, and the angles of rotation on the Poincare sphere for B, G, and R are respectively 111°, 90°, and 76°. Hence, the points P1_B, P1_G, and P1_R, which are the points P1 at the respective wavelengths, are slightly shifted. In the case of Example 5, the a value is equal to the above angle of rotation, and the wavelength dispersion of the α value is larger than that in the case of Example 3. The transmittance decreases as the a increases. Hence, the transmittance of Blue is relatively the lowest, and the transmissive display is yellowed.

This problem is solved by using a retarder for reverse wavelength dispersion whose phase difference becomes larger as the wavelength becomes longer. Examples of the retarder for reverse wavelength dispersion include a modified polycarbonate (PURE-ACE (registered trademark), manufactured by Teijin Chemicals Ltd.) and a laminated retarder obtained by laminating at least two retarders to control apparent wavelength dispersion. Coloring in the display mode of the mirror displays of Example 5' and Example 5" including these retarders for reverse wavelength dispersion was lower than that in Example 5, as shown in Table 2.

Comparison of the results of Examples 3, 3', and 3" and the results of Examples 5, 5', and 5" shows that a configuration including a λ/2 plate is more preferred in terms of avoiding coloration in transmissive display in the display mode. The configuration including a λ/2 plate can achieve favorable display performance with little coloration, regardless of the wavelength dispersion of the material of the retarder (λ/2 plate).

As described above, the mirror displays of Examples 1 to 11 can provide a mirror mode with a sufficiently high reflectance without deteriorating display performance.

These mirror displays can also increase the production efficiency without deteriorating the area yield of the half mirror plate. The mirror displays of Examples 3, 3', 3", 5, 5', 5", 6, 9, 10, and 11 can provide a mirror mode with a reflectance equal to that of normal mirrors and with sufficient practicability.

EXAMPLE 12

Figure 27:
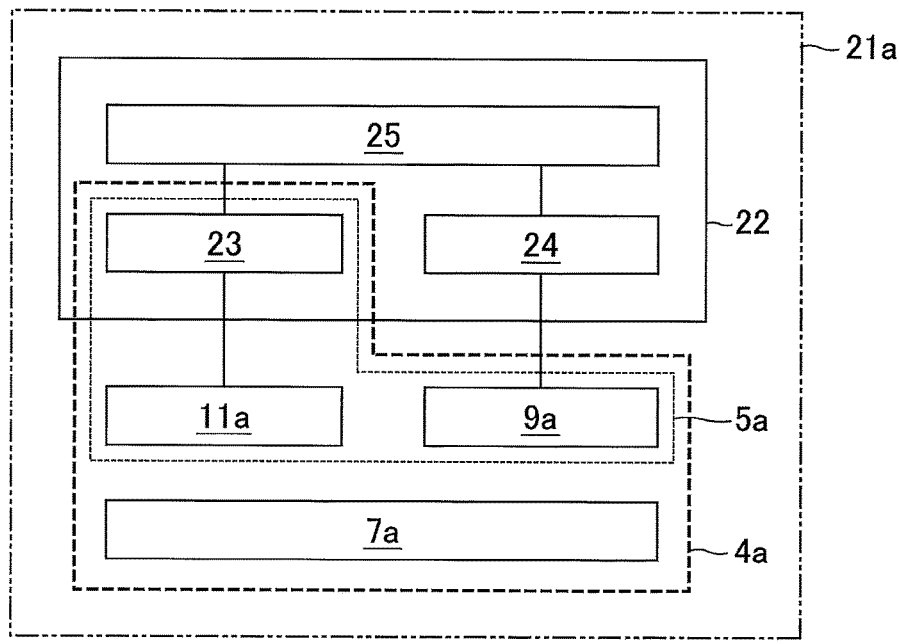
FIG. 27 is a block diagram for explaining the main structure of an electronic device of Example 12.

An electronic device of Example 12 is an electronic device including the mirror display 4a of Example 1 and a display light control device. FIG. 27 is a block diagram for explaining the main structure of an electronic device of Example 12. As illustrated in FIG. 27, the mirror display 4a includes the liquid crystal display device 5a and the half mirror plate 7a, and includes the liquid crystal panel 11a and the backlight 9a in the liquid crystal display device 5a. A display light control device 22 includes a panel control unit 23, a backlight control unit 24, and a signal control unit 25.

The panel control unit 23 includes a controller and a driver each configured to drive the liquid crystal panel 11a. For the physical structure thereof, the panel control unit may or may not be built in the liquid crystal display device 5a. In the present example, the panel control unit 23 is built in a liquid crystal television (trade name: LC-20F5, manufactured by Sharp Corp.) used as the liquid crystal display device 5a.

The backlight control unit 24 includes a controller and a driver each configured to drive the backlight 9a, and may or may not be built in the liquid crystal display device 5a. The backlight control unit 24 outputs signals for switching the display mode and the mirror mode. The backlight control unit 24 also provides an effect of turning off the backlight 9a in response to the presence or absence of image signals.

The signal control unit 25 outputs signals for operating the panel control unit 23 and the backlight control unit 24 together.

When a user selects the mirror mode, the display light control device 22 transmits a control signal for stopping the driving of the liquid crystal panel 11a to the panel control unit 23 and transmits a control signal for turning off the backlight 9a to the backlight control unit 24. This prevents unnecessary light leakage on the back-surface side of the mirror surface in the mirror mode, so that the mirror performance in the mirror mode can be maximized and the electric energy consumption of the liquid crystal display device 5a can be suppressed. The signal control unit 25 can be configured to transmit a control signal for turning off the backlight 9a to the backlight control unit 24 when the image signal is zero, i.e., the liquid crystal display device 5a shows a black screen.

The electronic device 21a of the present example may include any one of the mirror displays of Examples 2 to 11 instead of the mirror display 4a of Example 1.

EXAMPLE 13

Figure 28:
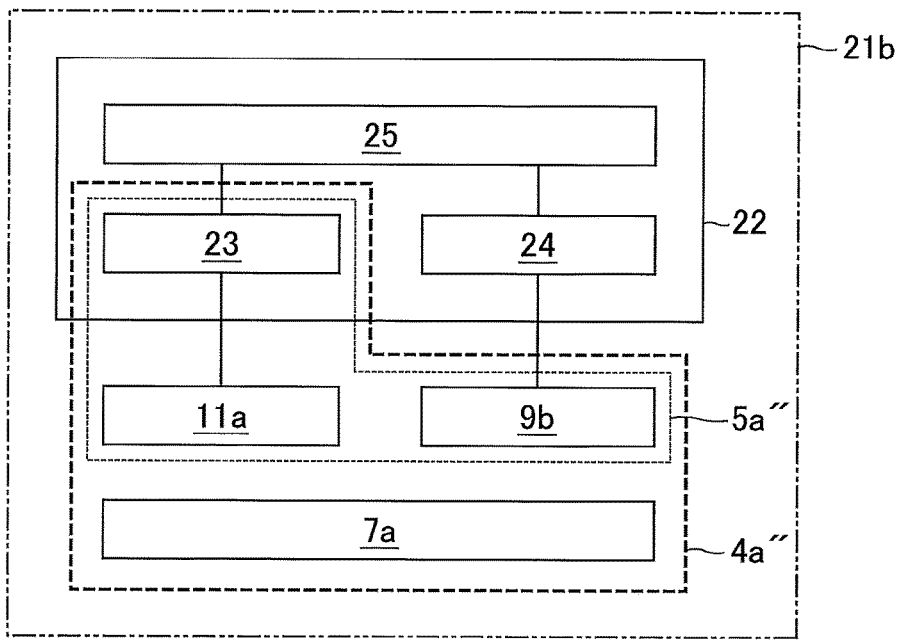
FIG. 28 is a block diagram for explaining the main structure of an electronic device of Example 13.
Figure 29:
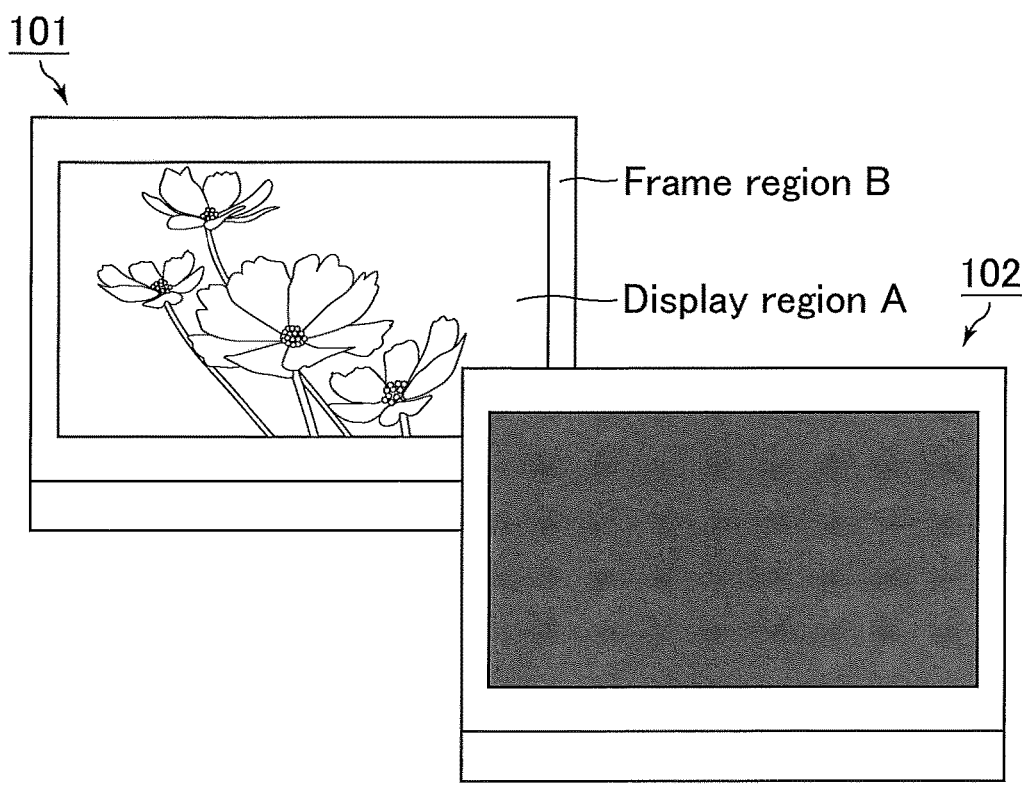
FIG. 29 is an explanatory view illustrating the display states in the power-on state and in the power-off state of a common conventional display device.

Example 13 relates to an electronic device including a mirror display and a display light control device. The difference from Example 12 is that a local-dimming backlight is used as the backlight of the liquid crystal display device. FIG. 28 is a block diagram for explaining the main structure of an electronic device of Example 13. As illustrated in FIG. 28, a mirror display 4a" includes a liquid crystal display device 5a" and the half mirror plate 7a, and includes the liquid crystal panel 11a and a local-dimming backlight 9b in the liquid crystal display device 5a". The display light control device 22 includes the panel control unit 23, the backlight control unit 24, and the signal control unit 25.

The local-dimming backlight is a backlight unit which has a light-emitting region divided into multiple blocks (domains) and has a function of controlling the luminances of the respective blocks of the backlight or turning off the backlight in response to an input image. In the present example, LED light sources were arranged in blocks of 16 rows×9 columns, and the luminances of the backlight can be controlled per block in response to the control signals from the LED controller.

Since the local-dimming backlight 9b can control the luminances of the backlight per block (in other words, locally), it can provide not only a function of switching the display mode and the mirror mode on the whole screen in terms of time but also a function of driving one domain in the mirror mode and another domain in the display mode at the same time on the same plane. For example, the center of the display region may be a mirror region. In the domain driven in the mirror mode, the backlight is locally turned off or the luminance thereof is reduced.

The electronic device 21b of the present example may further include an input device such as a touch panel. In this case, for example, the device may have a function of changing the sizes of the display region and the mirror region in response to pinch-in and pinch-out gestures on the touch panel. When a user performs a pinch-in gesture on a display (touch panel), the size of the display region is reduced and the size of the peripheral region, i.e., the mirror region, is expanded in response to the gesture. In contrast, when a user performs a pinch-out gesture on a display (touch panel), the size of the display region is expanded and the size of the peripheral region, i.e., the mirror region, is reduced in response to the gesture. Such operating feeling can improve the convenience of electronic devices and the commercial value thereof. This function can also be achieved in the electronic device 21a of Example 12, which includes no local-dimming backlight 9b, by showing a black screen in a region desired to serve as the mirror region. Still, if light leakage from the liquid crystal display device 5a deteriorates the mirror performance of the mirror region, a user may feel uncomfortable. Thus, the above function is particularly suitable for embodiments using the local-dimming backlight 9b, as shown in the present example.

The electronic device 21b of the present example may include, instead of the mirror display 4a", an alternative mirror display which is prepared by replacing the backlight 9a in one of the mirror displays of Examples 2 to 11 by the local-dimming backlight 9b.

[Remarks]

The following will describe examples of preferable embodiments of the mirror display of the present invention. The respective examples may appropriately be combined with each other within the spirit of the present invention.

In the present invention, the transmission axis of the polarizer in the display device and the transmission axis of the reflective polarizer included in the at least two half mirror layers in the half mirror plate are substantially parallel or perpendicular to each other. Configurations with such a relation include the following ones.

In the case where the display device includes one polarizer (e.g. the case where an anti-reflection polarizer is provided on an organic EL display device) or the display device includes polarizers whose transmission axes are parallel to each other (e.g. the case where a liquid crystal display device includes a pair of polarizers in parallel Nicols), and where the at least one reflective polarizer includes at least one multi-layer reflective polarizer, the mirror display is preferably configured such that the at least one reflective polarizer is substantially parallel to the transmission axis of the polarizer in the display device. Meanwhile, in the case where a liquid crystal display device employs a pair of polarizers in crossed Nicols, the polarizer closer (usually the front side) to the half mirror plate is eliminated, and the effects thereof is alternatively achieved by the multi-layer reflective polarizer in the half mirror plate, the polarizer farther from the half mirror plate in the liquid crystal display device and the multi-layer reflective polarizer are disposed in crossed Nicols. In this case, the mirror display is preferably configured such that the at least one reflective polarizer is substantially perpendicular to the transmission axis of the polarizer in the liquid crystal display device.

Also, in the case where the display device includes a pair of polarizers whose transmission axes are perpendicular to each other (e.g. the case where the liquid crystal display device includes a pair of polarizers disposed in crossed Nicols) and the at least one reflective polarizer includes at least one multi-layer reflective polarizer, the mirror display is preferably configured such that the at least one multi-layer reflective polarizer is substantially parallel to the transmission axis of the polarizer in the display device closer (usually the front side) to the half mirror plate. In this configuration, the at least one multi-layer reflective polarizer is substantially perpendicular to the transmission axis of the polarizer farther (usually the backside) from the half mirror plate.

The mirror display may have a configuration that the at least one reflective polarizer includes first and second reflective polarizers, the half mirror plate includes, in the order from the display device side, the first reflective polarizer, a retarder, and the second reflective polarizer, and the transmission axis of the first reflective polarizer and the transmission axis of the second reflective polarizer being substantially parallel to each other. Thereby, in the case of using two multi-layer reflective polarizers as the half mirror layers, the reflective polarizers can be disposed such that their transmission axes are substantially parallel to each other. As a result, the mirror display can be manufactured efficiently without deterioration in the area yield of the reflective polarizers.

The retarder may be a $\lambda/2$ plate. The $\lambda/2$ plate rotates the polarization axis, so that each of the at least two half mirror layers can be effectively used. Also in the case of using multiple multi-layer reflective polarizers as the half mirror layers, these reflective polarizers can be disposed such that their transmission axes are substantially parallel to each other. As a result, the mirror display can be manufactured efficiently without deterioration in the area yield of the reflective polarizers.

The retarder may be a $\lambda/4$ plate. The $\lambda/4$ plate converts the light into circularly polarized light, so that each of the at least two half mirror layers can be effectively used. Also in the case of using multiple multi-layer reflective polarizers as the half mirror layers, these reflective polarizers can be disposed such that their transmission axes are substantially parallel to each other. As a result, the mirror display can be manufactured efficiently without deterioration in the area yield of the reflective polarizers.

The retarder may be a polyethylene terephthalate (PET) film. A polyethylene terephthalate film can be a low-cost retarder, so that each of the at least two half mirror layers can be effectively used. Also in the case of using multiple multi-layer reflective polarizers as the half mirror layers, these reflective polarizers can be disposed such that their transmission axes are substantially parallel to each other. As a result, the mirror display can be manufactured efficiently without deterioration in the area yield of the reflective polarizers.

The half mirror plate may further include a depolarization layer between the at least two half mirror layers. The depolarization layer provides a depolarization effect, so that each of the at least two half mirror layers can be effectively used. Also in the case of using multiple multi-layer reflective polarizers as the half mirror layers, these reflective polarizers can be disposed such that their transmission axes are substantially parallel to each other. As a result, the mirror display can be manufactured efficiently without deterioration in the area yield of the reflective polarizers.

The depolarization layer may include a diffusion adhesive layer. The diffusion adhesive layer has a light diffusion function, so that each of the at least two half mirror layers can be effectively used. Also in the case of using multiple multi-layer reflective polarizers as the half mirror layers, these reflective polarizers can be disposed such that their transmission axes are substantially parallel to each other. As a result, the mirror display can be manufactured efficiently without deterioration in the area yield of the reflective polarizers.

The mirror display may have a configuration that the at least one reflective polarizer includes a multi-layer reflective polarizer and a reflective polarizer utilizing selective reflection of cholesteric liquid crystal, and the half mirror plate includes, in the order from the display device side, the multi-layer reflective polarizer and the reflective polarizer utilizing selective reflection of cholesteric liquid crystal. Cholesteric liquid crystal provides selective reflection, so that the half mirror plate can be effectively used. Also, since only one multi-layer reflective polarizer is used, the mirror display can be manufactured efficiently without deterioration in the area yield of the reflective polarizer.

The mirror display may have a configuration that the at least one reflective polarizer includes a multi-layer reflective polarizer, the at least two half mirror layers include a dielectric multi-layer film as well as the multi-layer reflective polarizer, and the half mirror plate includes, in the order from the display device side, the dielectric multi-layer film and the multi-layer reflective polarizer. The dielectric multi-layer film controls the transmittance and the reflectance by the principle of light interference, so that the half mirror plate can be effectively used. Also, since only one multi-layer reflective polarizer is used, the mirror display can be manufactured efficiently without deterioration in the area yield of the reflective polarizer.

The mirror display may have a configuration that the at least one reflective polarizer includes a multi-layer reflective polarizer, the at least two half mirror layers include a dielectric multi-layer film as well as the multi-layer reflective polarizer, and the half mirror plate includes, in the order from the display device side, the multi-layer reflective polarizer and the dielectric multi-layer film. The dielectric multi-layer film controls the transmittance and the reflectance by the principle of light interference, so that the half mirror plate can be effectively used. Also, since only one multi-layer reflective polarizer is used, the mirror display can be manufactured efficiently without deterioration in the area yield of the reflective polarizer.

The display device may be a liquid crystal display device. The display device may be any display device that emits polarized light, such as an organic electroluminescent display device in which an anti-reflection polarizer is laminated. Also, the display device may be a 3D display that can provide three-dimensional (3D) images. The 3D display can provide natural feeling of depth in the display region as well as in the mirror region, can improve the design of mirror displays, and enables mirror displays to be used in various fields. The method of providing three-dimensional images in 3D displays may be any method, preferably a naked-eye system eliminating the need for glasses. Examples of naked-eye system 3D displays include those employing the lenticular lens method or a parallax barrier method.

The mirror display may have a configuration that the liquid crystal display device includes, in the order from the half mirror plate side, a first polarizer, a liquid crystal layer, and a second polarizer, and the transmission axis of the at least one reflective polarizer is substantially perpendicular to the transmission axis of the second polarizer and substantially parallel to the transmission axis of the first polarizer. Thereby, the concept of the present invention can be suitably applied to the case where the display device is a liquid crystal display device.

Preferred embodiments of the mirror display of the present invention have been described above. The embodiments relating to the characteristics of the half mirror plate among these examples are also examples of preferred embodiments of the half mirror plate of the present invention.

The following will describe examples of preferred embodiments of the electronic device of the present invention.

The electronic device may have not only a function of switching the mirror mode and the display mode on the whole screen in terms of time but also a function of driving a certain domain in the mirror mode and another domain in the display mode at the same time on the same plane. For example, in the display device, the center portion of the display region may show a black screen and the peripheral portion thereof shows an image, so that the mirror region may be formed only at the center portion of the display region. In other words, the electronic device may further include a control device that controls the display region by dividing the display region into multiple domains. The control device may be configured to change the range and position of displaying an image by selecting a domain to display an image among the multiple domains. Since the range and position of displaying an image can be changed, various uses combining the mirror function and the image-displaying function of the display device can be provided.

In a domain driven in the mirror mode, the backlight of the electronic device may locally be turned off, or the luminance of the backlight may be reduced. This can suppress light leakage from the liquid crystal display device. In these cases, a local-dimming backlight may be used.

The range of displaying an image may be changeable in response to pinch-in and pinch-out gestures. This can achieve a convenient electronic device.

REFERENCE SIGNS LIST

1: mirror display in display mode
2: mirror display in mirror mode
4a, 4a', 4a", 4b, 4c, 4c', 4c", 4d, 4e, 4e', 4e", 4f, 4g, 4h, 4i, 4j, 4k, 4l, 104a, 104b, 104c, 104d, 104e: mirror display
5a, 5a": liquid crystal display device
6a: air layer
7a, 7a', 7b, 7c, 7c', 7c", 7d, 7e, 7e', 7e", 7f, 7g, 7h, 7i, 7j, 7k, 7l, 107a, 107b, 107c, 107d, 107e: half mirror plate
9a: backlight
9b: local-dimming backlight
10a, 10b: absorptive polarizer
11a: liquid crystal panel
12: glass plate
13a, 13b: reflective polarizer
14a, 14a', 14b, 14c, 14c', 14c": λ/2 plate
15a, 15b, 15b', 15b", 15c: retarder
16: polyethylene terephthalate (PET) film
17: diffusion adhesive layer
18: reflective polarizer utilizing selective reflection of cholesteric liquid crystal (ChLC selective reflection layer)
19a, 19b: dielectric multi-layer film
20a, 20b, 20c: vapor-deposited metal film
21a, 21b: electronic device
22: display light control device
23: panel control unit
24: backlight control unit
25: signal control unit
101: display device in power-on state
102: display device in power-off state

The invention claimed is:

1. A mirror display comprising:
a half mirror plate including at least two half mirror layers; and
a display device arranged on the backside of the half mirror plate, wherein
the display device includes a polarizer,
the at least two half mirror layers include a first reflective polarizer and a second reflective polarizer,
the half mirror plate includes, in an order from the display device side, the first reflective polarizer, a retarder, and the second reflective polarizer,
the retarder has a slow axis in an in-plane direction,
the transmission axis of the first reflective polarizer and the transmission axis of the second reflective polarizer are substantially parallel to each other,
the transmission axis of the polarizer is substantially parallel to or substantially perpendicular to the transmission axis of the first reflective polarizer and the transmission axis of the second reflective polarizer,
the mirror display switches between a display mode allowing display light to be emitted from the display device and to pass through the half mirror plate and a mirror mode preventing display light from being emitted from the display device,
the mirror display exhibits a sum of the transmittance in the display mode and the reflectance in the mirror mode of 100% or higher.

2. The mirror display according to claim 1, wherein the retarder is a λ/2 plate.

3. The mirror display according to claim 1, wherein the retarder is a λ/4 plate.

4. The mirror display according to claim 1, wherein the retarder is a polyethylene terephthalate film.

5. The mirror display according to claim 1, wherein the display device is a liquid crystal display device.

6. The mirror display according to claim 5, wherein the liquid crystal display device includes, in an order from the half mirror plate side, a first polarizer, a liquid crystal layer, and a second polarizer, and the transmission axis of the first reflective polarizer and the transmission axis of the second reflective polarizer are substantially perpendicular to the transmission axis of the second polarizer and substantially parallel to the transmission axis of the first polarizer.

7. An electronic device, comprising:
the mirror display according to claim 1; and
a control device that controls a display region facing the display device by dividing the display region into multiple domains, wherein
the control device changes the range and position of displaying an image by selecting a domain to display an image among the multiple domains.

8. The electronic device according to claim 7,
wherein the range of displaying an image is changeable in response to pinch-in and pinch-out gestures.

9. The mirror display according to claim 1,
wherein the azimuth angle of the slow axis of the retarder is different from the azimuth angle of the transmission axis of each of the first reflective polarizer and the second reflective polarizer.

10. A mirror display comprising:
a half mirror plate including at least two half mirror layers and a depolarization layer between the at least two half mirror layers; and
a display device arranged on the backside of the half mirror plate, wherein
the display device includes a polarizer,
the depolarization layer includes a diffusion adhesive layer,
the at least two half mirror layers include at least one reflective polarizer,
the transmission axis of the polarizer and the transmission axis of the at least one reflective polarizer are substantially parallel to each other or substantially perpendicular to each other,
the mirror display switches between a display mode allowing display light to be emitted from the display device and to pass through the half mirror plate and a mirror mode preventing display light from being emitted from the display device,
the mirror display exhibits a sum of the transmittance in the display mode and the reflectance in the mirror mode of 100% or higher.

11. The mirror display according to claim 10,
wherein the display device is a liquid crystal display device.

12. The mirror display according to claim 11, wherein
the liquid crystal display device includes, in an order from the half mirror plate side, a first polarizer, a liquid crystal layer, and a second polarizer, and
the transmission axis of the at least one reflective polarizer is substantially perpendicular to the transmission axis of the second polarizer and substantially parallel to the transmission axis of the first polarizer.

13. An electronic device, comprising:
the mirror display according to claim 10; and
a control device that controls a display region facing the display device by dividing the display region into multiple domains, wherein
the control device changes the range and position of displaying an image by selecting a domain to display an image among the multiple domains.

14. The electronic device according to claim 13,
wherein the range of displaying an image is changeable in response to pinch-in and pinch-out gestures.

* * * * *